US007420116B2

(12) United States Patent
Fujiwara

(10) Patent No.: US 7,420,116 B2
(45) Date of Patent: Sep. 2, 2008

(54) MUSIC DATA MODIFIER FOR MUSIC DATA EXPRESSING DELICATE NUANCE, MUSICAL INSTRUMENT EQUIPPED WITH THE MUSIC DATA MODIFIER AND MUSIC SYSTEM

(75) Inventor: Yuji Fujiwara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 204 days.

(21) Appl. No.: 11/261,949

(22) Filed: Oct. 27, 2005

(65) Prior Publication Data

US 2006/0130640 A1 Jun. 22, 2006

(30) Foreign Application Priority Data

Dec. 22, 2004 (JP) ............................ 2004-371416

(51) Int. Cl.
*G10H 7/00* (2006.01)
*H02M 5/00* (2006.01)

(52) U.S. Cl. ............................ 84/619; 84/601; 84/609; 84/613; 84/615

(58) Field of Classification Search ...................... None
See application file for complete search history.

(56) References Cited

U.S. PATENT DOCUMENTS

| | | | | |
|---|---|---|---|---|
| 6,380,470 | B1 | 4/2002 | Fujiwara et al. | |
| 6,403,872 | B2 * | 6/2002 | Muramatsu et al. | 84/724 |
| 2001/0003945 | A1 * | 6/2001 | Muramatsu et al. | 84/658 |
| 2005/0092164 | A1 * | 5/2005 | Fujiwara et al. | 84/645 |

FOREIGN PATENT DOCUMENTS

| | | |
|---|---|---|
| JP | 2001-066982 | 3/2001 |

* cited by examiner

*Primary Examiner*—Marlon T Fletcher
(74) *Attorney, Agent, or Firm*—Morrison & Foerster LLP

(57) ABSTRACT

A music data modifier receives pieces of original music data from a master hybrid piano, and partially modifies the pieces of original music data to pieces of modified music data for a slave hybrid piano; each piece of original music data contains a series of values of a piece of motion data expressing continuous motion of the associated key, a series of values of a piece of time data expressing each expressing a time to obtain the associated value of the motion data and a piece of identification code expressing the key number assigned to the key; even if the music data modifier changes the piece of identification data from the key number to another key number, the piece of motion data still expresses the continuous motion of the key so that the slave hybrid piano exactly reproduce the key motion.

20 Claims, 14 Drawing Sheets rM
(t, rxM, rvM, KnM)

| | |
|---|---|
| t1 | rxM |
| t1 | rvM |
| t1 | KnM |
| t2 | rxM |
| ... | ... |

rS
(t, rxS, rvS, KnS1, KnS2)

| | |
|---|---|
| t1 | rxS |
| t1 | rvS |
| t1 | KnS1 |
| t1 | KnS2 |
| t2 | rxS |
| ... | ... |

MUSIC DATA MODIFIER FOR MUSIC DATA EXPRESSING DELICATE NUANCE, MUSICAL INSTRUMENT EQUIPPED WITH THE MUSIC DATA MODIFIER AND MUSIC SYSTEM

FIELD OF THE INVENTION

This invention relates to a music data modifier and, more particularly, to a music data modifier for modifying pieces of music data, a musical instrument equipped with the music data modifier and a music system constituted by the musical instrument, another musical instrument and other system components.

DESCRIPTION OF THE RELATED ART

There are various sorts of musical instruments. All of the musical instruments are designed to produce tones intended by the players. In other words, the finger positions on the acoustic musical instrument uniquely correspond to the pitch names of the tones to be produced. For example, an acoustic piano has plural black keys and plural white keys, and the different pitch names are respectively assigned to the plural black and white keys. When the pianist wishes to produce a piano tone with a certain pitch name, he or she depresses one of the black and white keys assigned the certain pitch name. Similarly, a stringed musical instrument has plural strings stretched over a fingerboard, and the combinations between the strings and the finger positions on the fingerboard are respectively assigned the pitch names. When a player wishes to produce a tone with a certain pitch name, he or she presses one of the strings to a predetermined position on the fingerboard with his or her finger. Some keys of a wind instrument are respectively assigned plural groups of pitch names. For example, a key of a flute is assigned the pitch names different in octave from one another. However, the player controls the octave by his or her lips. Thus, the combinations between the lips and the finger positions uniquely correspond to the pitch names of the tones to be produced through the wind instrument.

A grand piano or an upright piano, i.e., the acoustic piano is one of the most popular musical instruments so that description is continued on the acoustic piano. In the acoustic piano, the black and white keys uniquely correspond to the strings from which the piano tones are produced at the predetermined pitches. When a pianist wishes to produce the piano tones at predetermined pitches, the pianist depresses the black/white keys assigned the pitch names, and the depressed keys give rise to rotation of the hammers through the associated action units. The hammers strike the associated strings at the end of the rotation, and give rise to the vibrations of the strings for producing the piano tones at the predetermined pitches. Thus, the uniqueness makes it possible to produce the piano tones along the music passages.

The uniqueness makes the manufacturers to design automatic player pianos. The manufacturer prepares key actuators and pedal actuators for the black and white keys and pedals, and memorizes the finger work and footwork in music data codes. When a user wishes to reenact the performance, he or she loads the music data codes into a controller, and instructs the controller selectively to depress and release the black and white keys by means of the key actuators along the music passage and sometimes step on the pedals by means of the pedal actuators. Since the black and white keys are uniquely corresponding to the piano tones, the music data codes makes it possible to reenact the performance on the acoustic piano.

A typical example of the protocols for the music data codes is known as "MIDI (Musical Instrument Digital Interface)". The music data codes produced in accordance with the MIDI protocols are hereinafter referred to as "MIDI music data codes". The key action and pedal action are defined as "events". The depressed keys and released keys give rise to the "note-on event" and "note-off event", and the pedal actions are correlated with the "effects". The pitch of tones is expressed as the "note number", and the loudness is converted to a value of the "velocity". While a user is recording a performance on the acoustic piano, a recorder successively converts the key actions and pedal actions into the corresponding MIDI music data codes. Thus, the performance is memorized in the set of MIDI music data codes.

However, the manufacturer can not memorize delicate artificial expression such as "half pedal" in the set of MIDI music data codes. In other words, it is impossible to express a delicate nuance in the performance through the MIDI music data codes.

Another sort of data protocols is disclosed in Japanese Patent Application laid-open No. 2004-077521. According to the data protocols, the key strokes and pedal strokes are continuously memorized in the music data codes during a performance. When the pianist brings the damper pedal into the half pedal state, the pedal stroke from the rest position to the half pedal point is stored in a music data code. While a controller is reenacting the performance, the controller instructs the pedal actuator to press down the damper pedal over the pedal stroke expressed by the music data code at the timing when the half pedal is to be taken place. Thus, the half pedal is reproduced in the reenactment. However, the key motion and pedal motion are reproduced without any modification. In other words, the keys and pedals to be moved are same as those moved in the original performance.

As described hereinbefore, the automatic player piano reenacts the performance already memorized in the set of music data codes. An acoustic tone generating system allows a human player to produce acoustic tones, which are modified from the tones expressed by the MIDI music data codes. A typical example of the acoustic tone generating system is disclosed in Japanese Patent Application laid-open No. 2003-208154. The prior art acoustic tone generating system comprises a keyboard on which a human player performs a music passage, a mechanically tone generating apparatus producing acoustic tones through vibrations of strings and a data modifier connected between the musical instrument and the mechanically tone generating apparatus.

While a human player is fingering on the keyboard, the keyboard produces MIDI music data codes representative of the tones intended to be produced, and supplies the MIDI music data codes to the data modifier. The data modifier modifies pieces of music data in the MIDI music data codes in accordance with an instruction already given by the human player. The data modifier changes the velocity from the original value to another value for mute, by way of example. Moreover, the data modifier changes the tones from the originally designated pitches to other pitches for the transposition. The data modifier further adds other tones, which are different in the pitch, to the originally designated tone, and delays the tones from the timing at which the human player depresses and/or releases the keys. The data modifiers further allots the originally designated tones in a narrow register to other tones in a wide register. Although the depressed keys and released keys are not uniquely corresponding to the tones produced through the mechanically tone generating apparatus, the modifications are based on the uniqueness between the keys and the tones originally designated by the human player. Since the originally designated tones and tones to be produced are expressed by the MIDI music data codes, it is impossible to give a delicate nuance to the tones produced through the mechanically tone generating apparatus.

The uniqueness is broken in a prior art electronic keyboard for a finger exercise disclosed in Japanese Patent Application laid-open No. 2001-066982. The prior art electronic keyboard has a small number of keys, and prompts a trainee to depress the keys with his or her fingers along a part of a music passage. The prior art electronic keyboard for a finger exercise monitors the keys to see whether or not the trainee exactly depresses the keys, and produces the tones only when the trainee correctly depresses the keys. In this instance, the correlation between the keys and the pitch names is varied depending upon the exercise and music passage. However, the breakage is only for the sake of exercise. The pieces of music data are coded into the MIDI music data codes, and the exercise is restricted to the fingering. It is impossible to give any exercise for delicate nuance. Of course, the MIDI music data codes are not expected to give delicate nuance to the tones.

SUMMARY OF THE INVENTION

It is therefore an important object of the present invention to provide a music data modifier, which modifies pieces of original music data capable of expressing delicate nuance to pieces of modified music data also capable of expressing delicate nuance.

It is also an important object of the present invention to provide a musical instrument, which is equipped with the music data modifier.

It is another important object of the present invention to provide a music system, in which the musical instrument is incorporated together with another musical instrument.

To accomplish the object, the present invention proposes to express tones to be produced by using series of values of pieces of original music data expressing continuous motion of manipulators so as make it possible to modify said pieces of original music data to pieces of modified music data representative of continuous motion of corresponding manipulators.

In accordance with one aspect of the present invention, there is provided a music data modifier for modifying a piece of original music data expressing continuous motion of a manipulator to a piece of modified music data expressing continuous motion of a corresponding manipulator, and the music data modifier comprises a memory for storing at least a piece of instruction data representative of a task given by a user and an information processor partially changing said piece of original music data to the piece of modified music data through an execution of a series of jobs for achieving the task.

In accordance with another aspect of the present invention, there is provided a musical instrument comprising a tone generating system including plural manipulators selectively moved by a player for specifying tones to be produced, and a music data modifier modifying a piece of original music data expressing continuous motion of a manipulator to a piece of modified music data expressing continuous motion of a corresponding manipulator and including a memory for storing at least a piece of instruction data representative of a task given by a user and an information processor partially changing the piece of original music data to the piece of modified music data through an execution of a series of jobs for achieving the task.

In accordance with yet another aspect of the present invention, there is provided a music system for producing tones comprising a master instrument including plural manipulators selectively moved for specifying tones to be produced, plural sensors monitoring the plural manipulators and converting continuous motion of the plural manipulators to pieces of motion data each expressing a series of values of physical quantity representative of the continuous motion of associated one of the plural manipulators and an information processor connected to the plural sensors, and producing pieces of original music data each expressing the continuous motion of the associated one of the plural manipulators, a music data modifier connected to the master instrument and including a memory for storing at least a piece of instruction data representative of a task given by a user and an information processor partially changing the pieces of original music data to pieces of modified music data expressing continuous motion to be produced for other manipulators through an execution of a series of jobs for achieving the task, and a slave instrument including the other manipulators independently moved, plural actuators respectively associated with the other manipulators and responsive to driving signals for selectively reproducing the continuous motion of the other manipulators and a motion controller connected to the music data modifier and producing the driving signals so as selectively to supply the driving signals to the plural actuators.

BRIEF DESCRIPTION OF THE DRAWINGS

The features and advantages of the music data modifier, musical instrument and music system will be more clearly understood from the following description taken in conjunction with the accompanying drawings, in which.

DESCRIPTION OF THE PREFERRED EMBODIMENTS

Figure 1:
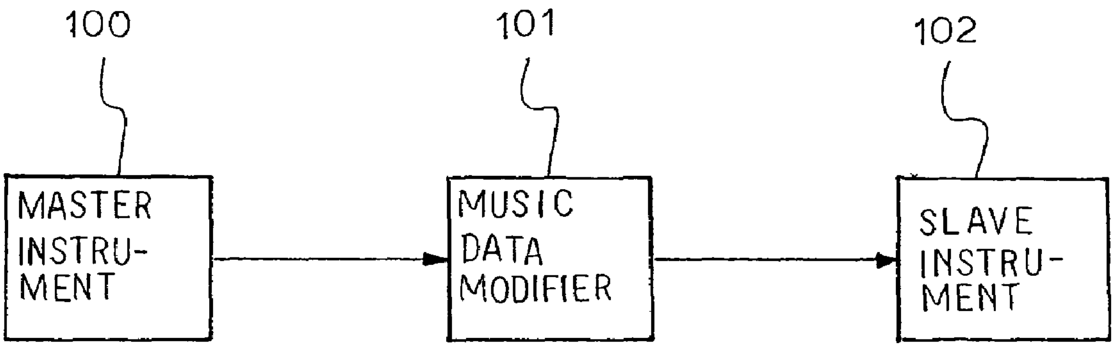
FIG. 1 is a block diagram showing the system configuration of a music system according to the present invention.

Referring to FIG. 1 of the drawings, a music system embodying the present invention largely comprises a master instrument 100 equipped with plural keys, a music data modifier 101 and a slave instrument 102 equipped with a tone generator. The master instrument 100 is connected to the music data modifier 101, which in turn is connected to the slave instrument 102. Accordingly, pieces of music data expressing motion of the manipulators flow from the master instrument 100 through the music data modifier 101 to the slave instrument 102. As will be hereinlater described in detail, the pieces of original music data, which are output from the master instrument 100, are modified in the music data modifier 101 to pieces of modified music data expressing modified motion of the manipulators. The slave instrument converts the pieces of modified music data to tones. Thus, a player gives rise to the motion of the manipulators in the master instrument 100, and the tones are produced through the slave instrument 102.

A human player is assumed selectively to manipulate the manipulators so as to perform a music passage. The manipulators continuously travel on trajectories. The human player selectively gives rise to the motion of the manipulators on the trajectories for specifying the tones to be produced.

The master instrument 100 produces the pieces of original music data expressing the motion of the manipulators. A series of values of each piece of original music data expresses the actual motion of one of the manipulators on the trajectory. Various sorts of physical quantity such as, for example, the position on the trajectory, velocity on the trajectory, acceleration on the trajectory and the force exerted on the plungers or keys are available for expressing the motion. The motion may be expressed by using one of or more than one of these sorts of the physical quantity.

When the player gives rise to the motion of a manipulator in an ordinary manner and, thereafter, the motion of another manipulator in an extraordinary manner for imparting an artificial expression to the tones, the master instrument produces a piece of original music data expressing the ordinary motion and a piece of original music data expressing the extraordinary motion. Thus, the master instrument saves the artificial expression in the piece of original music data for the tone. This is because of the fact that a series of the piece of original music data directly expresses the continuous motion of the manipulator.

The pieces of original music data are transferred from the master instrument 100 to the music data modifier 101, and the music data modifier 101 produces pieces of modified music data on the basis of the pieces of original music data through a pre-selected data processing. The pieces of modified music data express modified motion of the manipulators. The modified motion of manipulators is different from or identical with the original motion produced in the master instrument 100. The correspondence between the original motion and the modified motion is dependent on the pre-selected data processing. Nevertheless, the music data modifier transplants the artificial expression from the pieces of original music data to the pieces of modified music data so that the music system saves the artificial expression for the performance on the slave instrument. In case where the modified motion is identical with the original motion, the manipulator may be changed to another manipulator. In other words, the slave instrument 102 gives rise to the modified motion same as the original motion for another manipulator.

The pieces of modified music data are supplied from the music data modifier 101 to the slave instrument 102. The slave instrument 102 analyzes the pieces of modified music data, and determines tones to be produced through the modified motion expressed by the pieces of modified music data. The tones are produced through the slave instrument 102. In case where the human player has instructed the music data modifier 101 to transpose the music passage from a certain key to another key, the music data modifier 101 only changes the manipulators from the pitch names designated through the master instrument 100 to corresponding pitch names. However, the artificial expression is still left in the corresponding tone or tones, because the features of the original motion are transplanted into the modified motion.

The slave instrument 102 may produce the tones in synchronism with the manipulation on the manipulators of the master instrument 100, i.e., in a real time fashion. Otherwise, the pieces of original data or pieces of modified data are temporarily stored in a data storage, and the slave instrument 102 produces the tones on the basis of the pieces of modified music data when a user instructs the music system to reproduce the tones.

The music system is implemented by two instruments remote form each other or a single musical instrument. Otherwise, the master instrument 100, music data modifier 101 and slave instrument 102 are physically independent of one another. In case where the two instruments form the music system, the music data modifier 101 is incorporated in the master instrument 100 or slave instrument 102. In case where the music system is realized in a single musical instrument, the manipulators are shared between the master instrument 100 and the slave instrument 102. For example, the array of manipulators partially forms components of the master instrument 100, and partially components of the slave instrument 102. Both master and slave instruments may be incorporated in each of the plural instruments. In this instance, the plural instruments are bidirectionally communicable with one another.

Various applications are found for the music system. Plural slave instruments 102 may be prepared for a single master instrument 100, and the single master instrument 100 communicates with the plural slave instruments 102 through a private communication channel or a public communication channel. In this instance, a pianist may perform pieces of music on the master instrument 100 on a stage in a large convert hall, and the pieces of original music data are distributed to the plural slave instruments 102 in satellite halls. The delicate nuance is transferred from the master instrument 100 to the plural slave instruments 102 so that the audience enjoys the performance in the satellite halls.

The music system may be useful in the music education. A teacher can concurrently give an exhibition to his or her students. The bi-directional communicable music system is desirable for this purpose. Since the original key motion is exactly reproduced on the slave instrument, the students will exactly understand the fingering of the teacher on the slave instruments. The teacher may instruct the students to put their fingers on the manipulators of the slave instruments so as to experience the motion of the manipulators.

In the following description, term "front" is indicative of a position closer to a player, who is sitting on a stool for fingering, than a position modified with term "rear". A line drawn between a front position and a corresponding rear position extends in a "fore-and-aft direction", and the fore-and-aft direction crosses a lateral direction at right angle. A vertical direction is normal to a plane defined by the fore-and-aft direction and lateral direction. Term "longitudinal direction" is dependent on the configuration of a part, and the term "longitudinal" is indicative of a direction of length of a part greater than a direction of "width" of the part.

First Embodiment

A music system embodying the present invention comprises a master hybrid piano 100A, a slave hybrid piano 102A, which serve as the master instrument 100 and slave instrument 102, respectively, and a music data modifier 101A. The master hybrid piano 100A and slave hybrid piano 102A are connected to each other through the music data modifier 101A and a communication channel. In this instance, the music data modifier 101A is physically separated from both of the master hybrid piano 100A and slave hybrid piano 102A. For this reason, a data transmitter and a data receiver are incorporated in the master hybrid piano 100A and slave hybrid piano 102A, respectively, and the music data modifier 101A is equipped with a data transmitter and data a receiver. Data communication protocols, which have been already known, are employed in the music system for the communication.

Master Hybrid Piano and Slave Hybrid Piano

Figure 2:
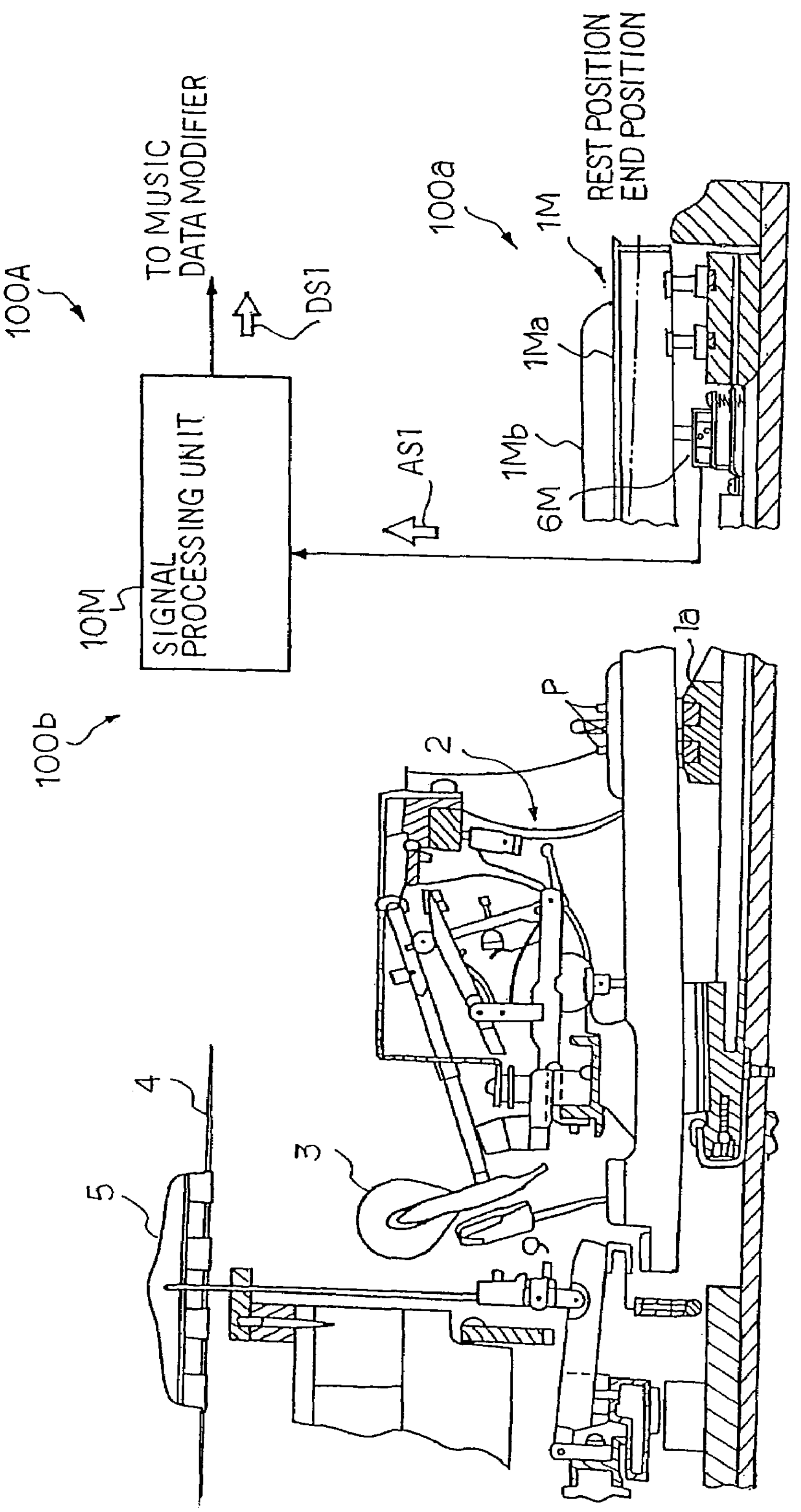
FIG. 2 is a cross sectional side view showing the structure of a master hybrid piano incorporated in a music system of the present invention.

FIG. 2 shows a master hybrid piano 100A. The master hybrid piano 100A largely comprises an acoustic piano 100*a* and an electronic system 100*b*. The electronic system 100*b* has a data processing capability, and monitors the acoustic piano 100*a* for producing pieces of original music data. The pieces of original music data are transferred from the electronic system 100*b* to the music data modifier 101A.

The acoustic piano 100*a* includes a keyboard 1M, which has white keys 1Ma and black keys 1Mb, action units 2, hammers 4, strings 4 and dampers 5. The white keys 1Ma and black keys 1Mb are laid on the well-known pattern, and pitch names are respectively assigned to the white and black keys 1Ma/1Mb. The pitch names are expressed as a key number Kn so that the key number Kn is varied from the leftmost white key 1Ma to the rightmost white key 1Ma. In this instance, eighty-eight keys 1Ma/1Mb are incorporated in the keyboard 1M, and the key number Kn is varied from "1" to "88". For this reason, the lowest pitch name and highest pitch name are expressed as "Kn1" and "Kn88".

The white keys 1Ma and black keys 1Mb extend in the fore-and-aft direction, and cross over a balance rail 1*a*. Balance pins P project from the balance rail 1*a*, and offer fulcrums to the white and black keys 1Ma/1Mb. When force is exerted on and removed from the front portions of the white and black keys 1Ma/1Mb, the white and black keys 1Ma/1Mb pitch up and down, and are moved on respective trajectories between rest positions and end positions, and term "keystroke" expresses the distance from the rest positions to current key positions along the key trajectories. In this instance, the end positions at the front ends of the white and black keys 1Ma/1Mb are spaced from the rest positions by 10 millimeters so that the full keystroke is 10 millimeters.

The white keys and black keys 1Ma/1Mb are respectively linked with the action units 2 so that a player selectively actuates the action units 2 by means of the white and black keys 1Ma/1Mb. The hammers 3 are respectively connected to the action units 2, and are drive for rotation through escape. The strings 4 are stretched over the associated hammers 3, and the hammers 3 are brought into collision with the associated strings 4 at the end of the rotation. Then, the strings 4 vibrate, and produce the tones at the pitches identical with the pitch names assigned the white and black keys 1Ma/1Mb through the vibrations. The dampers 5 are linked with the white and black keys 1Ma/1Mb, and are spaced from and brought into contact with the strings 4 depending upon the key motion. While the dampers 5 are being spaced from the strings 4, the strings 4 are vibratory, and, accordingly, can produce the tones. However, when the dampers 5 are brought into contact with the strings 4, the vibrations are decayed, and the tones are extinguished. Thus, the acoustic piano 100*a* behaves in the well-known manner.

The electronic system 100*b* includes key sensors 6M and a signal processing unit 10M. The key sensors 6M are connected to the signal processing unit 10M, and the signal processing unit 10M is connected through the communication channel to the music data modifier 101A. Pieces of motion data expressing the motion of the white and black keys 1Ma/1Mb are supplied from the key sensors 6M to the signal processing unit 10M. In this instance, the keystroke or series of current key positions stand for the key motion. The signal processing unit 10M produces the pieces of original music data on the basis of the pieces of motion data, and supplies a digital music data signal DS1 representative of the pieces of original music data to the music data modifier 101A through the communication channel.

The key sensors 6M are, by way of example, implemented by photocouplers and shutter plates. The shutter plates are respectively secured to the lower surfaces of the white and black keys 1Ma/1Mb, and travel on respective trajectories together with the white and black keys 1Ma/1Mb. The photo couplers radiate light beams across the trajectories of the associated shutter plates so that the amount of light is varied depending upon the current positions of the shutter plates and, accordingly, the current key positions on the key trajectories. The full-keystroke is overlapped with the detectable range of the key sensors 6M. The key sensor disclosed in Japanese Patent Application laid-open No. 2004-77521 is available for the electronic system 100*b*. Thus, the key sensors 6M convert the current key positions on the key trajectories or the keystroke of the white and black keys 1Ma/1Mb to key position signals AS1, and supply the key position signals AS1 to the signal processing unit 10M.

The signal processing unit 10M includes an interface (not shown), a data processor (not shown), a memory (not shown) and the data transmitter (not shown), and the key sensors 6M are connected to the interface. The key position signals AS1 arrive at the interface. Analog-to-digital converters are incorporated in the interface so that the key position signals AS1 are converted to digital key position signals. A computer program runs on the data processor, and the data processor periodically produces the pieces of original music data expressing the motion of the eighty-eight keys 1Ma/1Mb on the basis of the pieces of key motion data through the execution of the programmed instructions.

Figure 3:
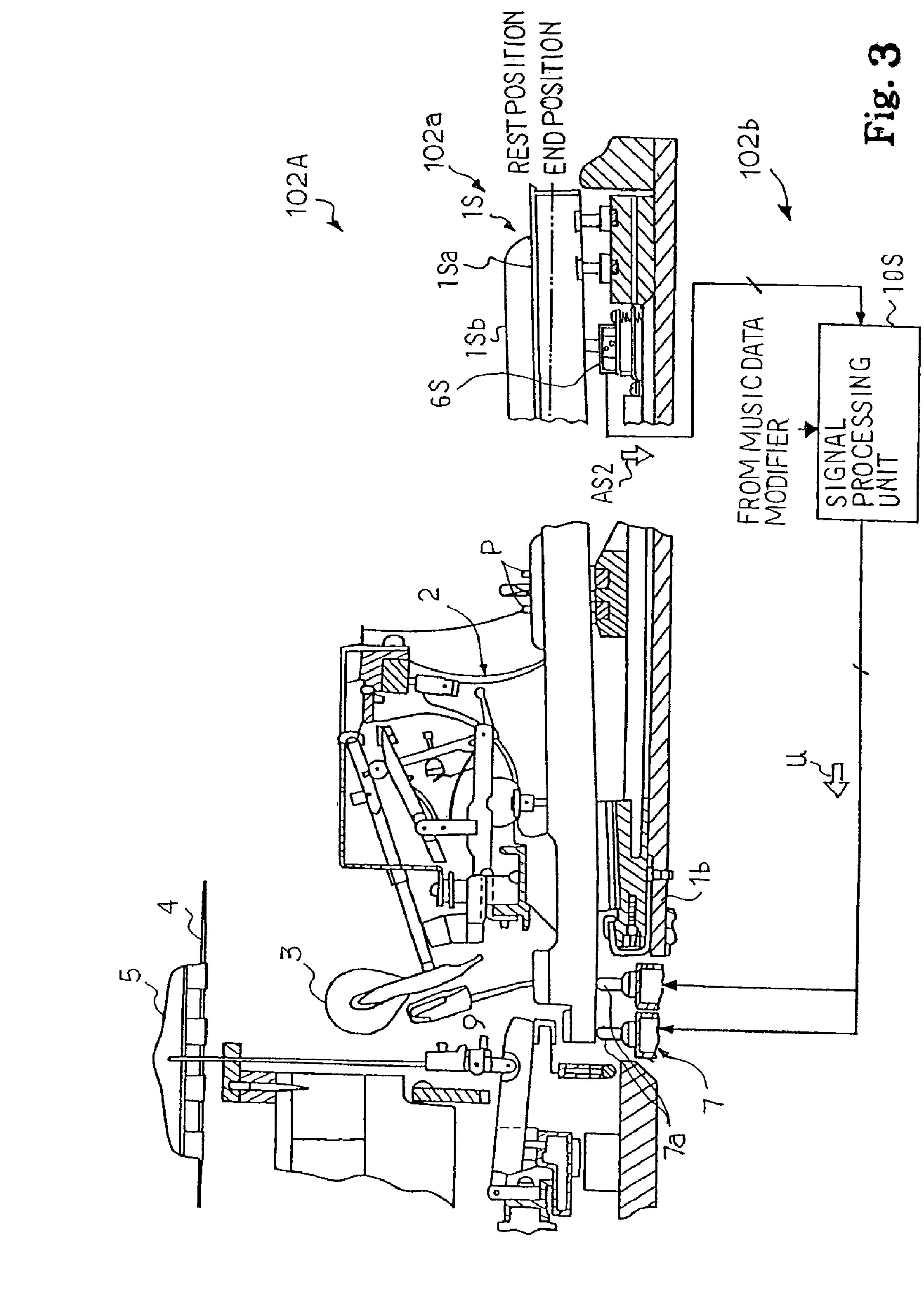
FIG. 3 is a cross sectional side view showing the structure of a slave hybrid piano incorporated in the music system.

Turning to FIG. 3 of the drawings, the slave hybrid piano 102A is implemented by an automatic player piano, and is also broken down into an acoustic piano 102*a* and an electronic system 102*b*. The acoustic piano 102*a* is similar in structure to the acoustic piano 100*a*. For this reason, most of the component parts of the acoustic piano 102*a* are labeled with references designating the corresponding component parts of the acoustic piano 100*a* without detailed description for the sake of simplicity. However, the keyboard, white keys and black keys are labeled with references "1S", "1Sa" and "1Sb", respectively in order to make them discriminative from those of the master hybrid piano 100A.

The electronic system 102*b* includes key sensors 6S, a signal processing unit 10S and solenoid-operated key actuators 7. The key sensors 6S are implemented by the optical sensors, which are same as those for the key sensors 6M, and form a servo control loop together with the signal processing unit 10S and solenoid-operated key actuators 7. The key sensors 6S output analog key position signals AS2 to the signal processing unit 10S. The signal processing unit 10S is similar in hardware to the signal processing unit 10M except for a computer program and a solenoid driver circuit 27. For this reason, only the computer program is hereinlater described in detail.

The solenoid-operated key actuators 7 are respectively provided for the white and black keys 1Sa/1Sb, and are installed under the rear portions of the white and black keys 1Sa/1Sb. The yoke and solenoids are supported by a key bed 1*b* by means of a bracket (not shown), and are stable with respect to the key bed 1*b*. On other hand, the plungers 7*a* are projectable from and retractable into the associated solenoids. The solenoid driver circuit 27 of the signal processing unit 10S is connected to the solenoids, and selectively supplies driving signals u to the solenoids. When the solenoids are energized with the driving signals u, magnetic fields are created, and cause the associated plungers 7*a* to push the rear portions of the white and black keys 1Sa/1Sb upwardly.

Figure 4:
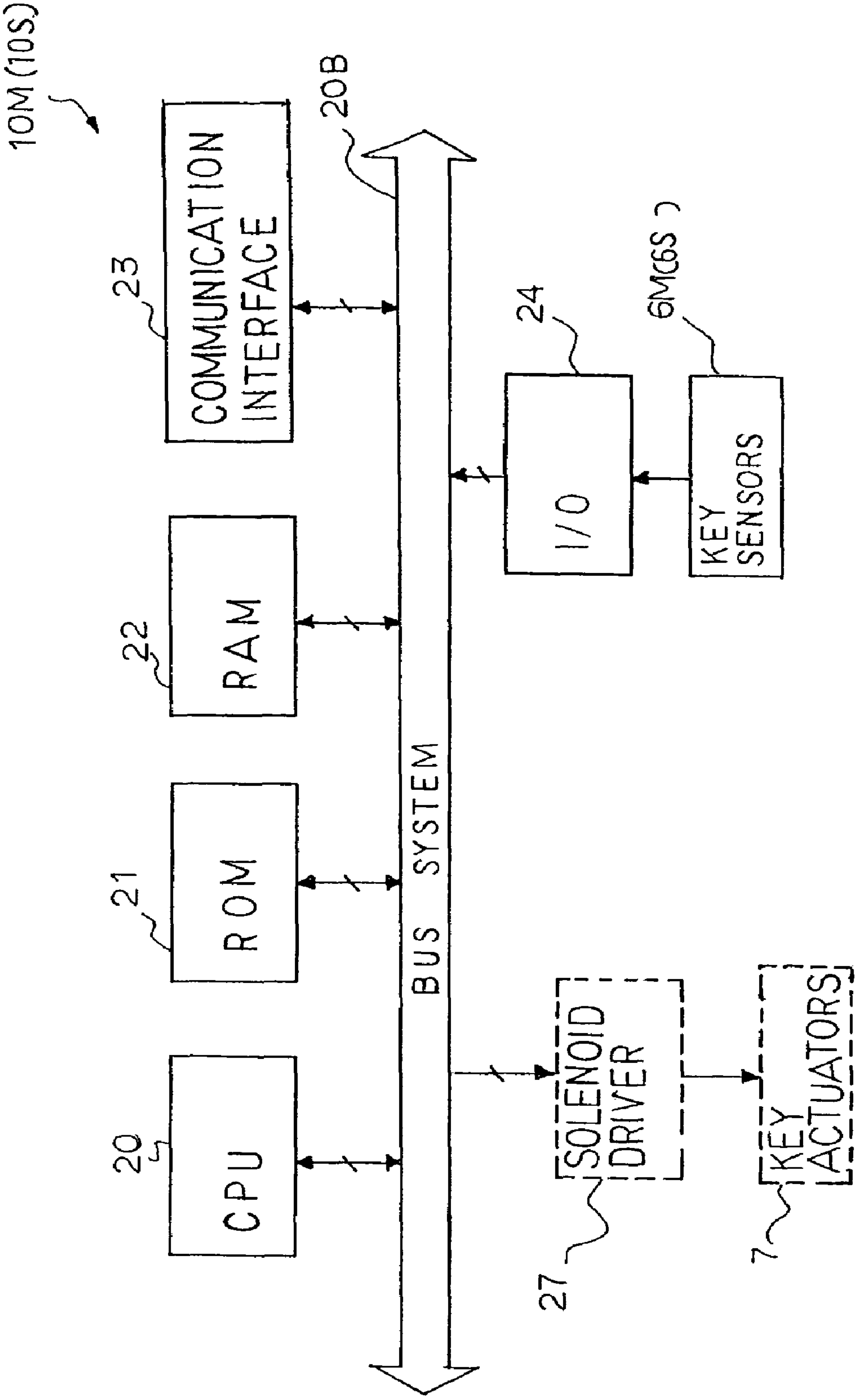
FIG. 4 is a block diagram showing the system configuration of signal processing units incorporated in both hybrid pianos.

Turning to FIG. 4 of the drawings, each of the signal processing units 10M and 10S includes a central processing unit 20, which is abbreviated as "CPU", a read only memory 21, which is abbreviated as "ROM", a random access memory 22, which is abbreviated as "RAM", a communication interface 23 and a signal interface 24, which is abbreviated as "I/O". Since the solenoid driver 27 is only incorporated in the signal processing unit 10S, the box 27 is drawn by broken lines. In this instance, the read only memory 21 is implemented by a semiconductor electrically erasable and programmable read only memory such as, for example, a flash memory.

The central processing unit 20 is the origin of the data processing capability. A computer program is stored in the read only memory 21, and the central processing unit 20 sequentially fetches the programmed instruction codes of the computer program from the read only memory 21 so as to achieve given tasks. Pieces of calibration data and pieces of control data information are further stored in the read only memory 21. The tasks are different between the central processing unit 20 incorporated in the signal processing unit 10M and the central processing unit 20 incorporated in the signal processing unit 10S. Other data codes, which express coefficients, thresholds, reference values and so forth, are further stored in the read only memory 21, and the central processing unit 20 selectively reads out the data codes during the data processing. The electrically erasable and programmable read only memory is desirable for version-up of the computer program.

Results of the data processing are temporarily stored in the random access memory 22, and predetermined memory locations are assigned to flags, tables, counters and timers.

The communication interface 23 is connected to the music data modifier 101. The music data codes are output from the communication interface 23 of the signal processing unit 10M to the music data modifier 101, and the modified music data codes arrive at the communication inter face 23 of the signal processing unit 10S.

The signal interface 24 includes analog-to-digital converters (not shown), and the key sensors 6M or 6S are selectively connected to the analog-to-digital converters. The analog key position signals AS1, which are continuously output from the key sensors 6M/6S, are periodically converted to digital key position signals DS2 in synchronism with a clock signal, and the digital key position signals DS2 are fetched by the central processing unit 20. Though not shown in the drawings, the signal interface 24 further includes data buffers connected to a manipulating panel. The central processing unit 20 supplies data codes expressing visual images through the data buffer, and informs the user of current status of the master hybrid piano 100A or slave hybrid piano 102A and options to be taken by the user. Thus, the user communicates with the master hybrid piano 100A or slave hybrid piano 102A through the manipulating panel.

The signal processing unit 10S further includes the solenoid driver 27. The solenoid driver 27 has a pulse width modulator. The driving signals u are adjusted to a proper duty ratio, and are supplied to the solenoids of the solenoid-operated key actuators 7. Since the solenoid-operated key actuators 7 exert the force on the plungers 7*a* in proportional to the mean current of the driving signals u, i.e., the duty ratio of the driving signals u, the plunger stroke and, accordingly, the keystroke are controllable through the pulse width modulation in the solenoid driver 27.

These system components 20, 21, 22, 23 and 24 are connected to the bus system 20B, and the data codes, address codes and control codes are transmitted among the system components 20 to 24. The solenoid driver 27 is also connected to the bus system 20B so that the central processing unit 20 instructs the solenoid driver 27 in the target duty ratio.

Music Data Modifier

The music data modifier 101A has a data processing capability, and is responsive to user's instructions so as to modify the pieces of original music data to pieces of modified music data. The system configuration of the music data modifier is similar to the system configuration of the signal processing unit 10M shown in FIG. 4. For this reason, no further description is hereinafter incorporated for the sake of simplicity.

The user's instructions are given to the music data modifier 101A through the manipulating panel, and a piece of instruction data representative of the user's instruction is stored in the random access memory 22. Alternately, the user gives the instructions to the music data modifier 101A through the master hybrid piano 100A or slave hybrid piano 102A. One of the instructions indicates how the music data modifier 101A is to modify the pieces of original music data, and makes the music data modifier 101A get ready to modify the pieces of original music data. In other words, the main routine program branch a subroutine program for the music data modification. The instruction may indicate the octave shift or a transposition.

A table for the transposition is stored in the read only memory 21. When the user instructs the music data modifier 101A of the transposition, the central processing unit 20 accesses the table with the piece of identification data KnM, and reads out a piece of modified identification data KnS representative of the key number Kn in the different key, and produces a piece of modified music data containing the pieces of motion data rxS, rvS, piece of modified identification data KnS and piece of time data t.

Functions of Music System

Figures 5A, 5B, 5C:
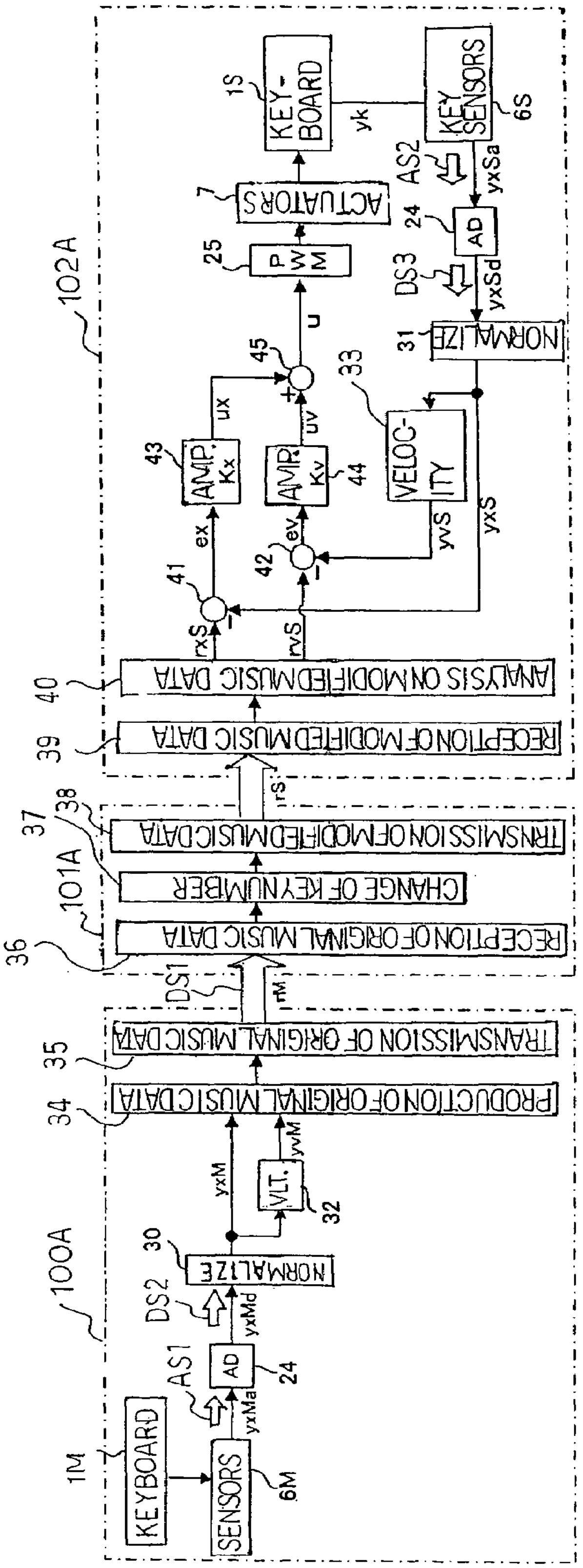
FIG. 5A is a block diagram showing functions of the music system.
FIGS. 5B and 5C are views showing a piece of music data and a corresponding piece of modified music data.

FIG. 5A shows functions of the music system. As described in conjunction with the system configuration of the signal processing unit 10M, the key sensors 6M continuously produce the analog key position signals AS1 representative of pieces of motion data yxMa, and the analog key position signals AS1 are periodically converted to the digital key position signals DS2 by means of the analog-to-digital converters of the interface 24. The pieces of motion data, which are memorized in the digital key position signals DS2, are expressed as "yxMd". The pieces of motion data yxMd also express the current key positions of the white and black keys 1Ma/1Mb or keystroke. The central processing unit 20 fetches the digital key position signals DS2 from the interface 24, and achieves the following tasks through the digital data processing.

First, the central processing unit 20 normalizes the pieces of motion data yxMd as by block 30. In other words, the individuality of the acoustic piano 102*a* and key sensors 6M are eliminated from the pieces of motion data yxMd, and the pieces of motion data yxMd in the unit employed in the master hybrid piano 100A are converted to the pieces of motion data yxM in the unit employed in the slave hybrid piano 102A, if necessary. The pieces of normalized motion data yxM are accumulated in the random access memory 22 for each of the white and black keys 1Ma/1Mb.

Subsequently, the central processing unit 20 determines another sort of motion data yvM expressing current key velocity on the basis of the pieces of normalized motion data yxM as by block 32, and the pieces of motion data yvM are also accumulated in the random access memory 22. The current key velocity may be determined through a differentiation on the pieces of motion data yxM.

Subsequently, the central processing unit 20 produced the pieces of original music data rM on the basis of the pieces of motion data yxM and yvM. In detail, the analog key position signals AS1, which are supplied from all the white and black keys 1Ma and 1Mb to the interface 24, are sequentially converted to the digital key position signals DS2 through the analog-to-digital converters, and the central processing unit 20 respectively links the key numbers Kn to the digital key position signals DS2 so as to accumulate the pieces of normalized motion data yxM and pieces of motion data yvM in the memory locations respectively assigned to the white and black keys 1Ma and 1Mb. The Moreover, the central processing unit 20 periodically measures the lapse of time by using one of the counters, and reads the time t when each piece of motion data yxMd is fetched. The central processing unit 20 labels each piece of normalized motion data yxM and piece of motion data yvM with the time t, and accumulates them in the predetermined memory location assigned to associated one of the white and black keys 1Ma/1Mb as a piece of motion data rxM expressing the normalized current key position at the time t and a piece of motion data rvM expressing the current key velocity at the time t. Thus, each piece of original music data rM contains a piece of motion data rxM, a piece of motion data rvM, a piece of time data t and a piece of identification data KnM expressing the key number Kn as shown in FIG. 5B. In FIG. 5B, the pieces of motion data rxM/rvM and piece of identification data KnM are labeled with the piece of time data t1, and form a piece of original music data rM. The motion of the white or black key KnM is described in the pieces of motion data rxM/rvM. Block 34 stands for the transmission of the piece of original music data rM.

Subsequently, the central processing unit 20 transfers the piece of original music data rM to the communication interface 23, and the piece of original music data rM is transmitted to the music data modifier 101A as by block 35.

The music data modifier 101A is responsive to user's instruction to as to modify the pieces of original music data rM. The user gives the instruction to the music data modifier 101A through the manipulation panel (not shown). The user is assumed to have instructed the music data modifier 101A to shift the pitch of the tone to be produced by one octave. The modification is hereinafter referred to as an "octave shift".

The piece of original music data rM arrives at the music data modifier 101A as by block 36, and the music data modifier 101A partially changes the piece of original music data rM to a piece of modified music data rS. In this instance, the user has instructed the music data modifier 101A of the octave shift. For this reason, the music data modifier 101A extracts the piece of identification data KnM from the piece of original music data rM, and adds "12" to and/or subtracts "12" from the key number Kn as by block 37. The key numbers Kn−12 and Kn+12 are hereinafter referred to as "the first shifted key number KnS1" and "the second shifted key number KnS2", respectively, and pieces of modified identification data KnS1 and KnS2 express the first shifted key number KnS1 and the second shifted key number KnS2.

The piece of original identification data KnM is replaced with the piece or pieces of modified identification data KnS1/KnS2. The pieces of motion data rxM/rvM and piece of time data t are unchanged, and serve as pieces of motion data rxS/rvS and piece of time data t. As a result, the piece of modified music data rS contains the pieces of motion data rxS/rvS, piece of time data t and piece of modified identification data KnS1/KnS2 as shown in FIG. 5C. Thus, the motion of keys KnS1 and KnS2 is still described in the piece of modified music data rS.

Upon completion of the data modification, the music data modifier 101A transmits the piece of modified music data rS to the slave hybrid piano 102A as by block 38.

The piece of modified music data rS is assumed to receive the slave hybrid piano 102A as by block 39. The central processing unit 20, which is the origin of the data processing capability of the signal processing unit 10S, fetches the piece of modified music data rS, and analyzes the piece of modified music data rS. The central processing unit 20 specifies the white or black keys 1Sa/1Sb on the basis of the pieces of identification data KnS1 and KnS2, and determines a target key position rxS and a target key velocity rvS at the time t on the basis of the pieces of motion data rxS/rvS through the analysis as by block 40.

The central processing unit 20 reads out an actual key position yxS and an actual key velocity yvS from the random access memory 22, and compares the target key position rxS and target key velocity rvS with the actual key position yxS and actual key velocity yvS to see how much the differences ex/ev are as by circles 41 and 42. As will be hereinlater described in detail, the key sensors 6S monitor the white keys 1Sa and black keys 1Sb so as to report the actual key position yk to the signal processing unit 10S, and the actual key position yxS and actual key velocity yvS are renewed every sampling period.

The central processing unit 20 respectively multiplies the stroke difference ex and velocity difference ev by gains kx and kv as by blocks 43 and 44, and adds the product ux to the product uv as by circle 45. The gains kx and kv make the stroke difference ex and velocity difference ev converted to respective values of percentage in the duty ratio.

The central processing unit 20 supplies the sum of products u, i.e., (ux+uv) to the solenoid driver 27, and requests the solenoid driver 27 to supply the driving signals u to the white or black keys 1Sa/1Sb assigned the first shifted key number KnS1 and second shifted key number KnS2. The solenoid driver 27 adjusts the driving signals u to the target duty ratio equivalent to the sum of products u, and supplies the driving signals u to the white or black keys 1Sa/1Sb.

While the solenoids are being energized with the driving signals u, the solenoids increase the thrust on the plungers 7*a*, and the plungers 7*a* move the white or black keys 1Sa/1Sb toward the target key positions.

The key sensors 6S convert the actual key positions yk to the analog key position signals AS2, and the pieces of motion data yxSa, which express the actual key positions yk, are supplied to the signal processing unit 10S.

The analog key position signals AS2 are converted to digital key position signals DS3, which express pieces of motion data yxSd, by means of the analog-to-digital converters incorporated in the interface 24, and the pieces of motion data yxSd are fetched by the central processing unit 20.

The central processing unit 20 normalizes the pieces of motion data yxSd so as to eliminate the individuality of the acoustic piano 102*a* and individuality of the key sensors 6S from the pieces of motion data yxSd as by block 31, and memorizes the actual key position yxS in the random access memory 22. The central processing unit 20 reads out the series of actual key positions yxS from the random access memory 22, and determines the actual key velocity yvS as by block 33.

The actual key position yxS and actual key velocity yvS will be read out from the random access memory 22 in order to determine the stroke difference ex and velocity difference ev from the next piece of modified music data rS.

As will be understood from the foregoing description, the music data modifier 101A modifies the pieces of original data expressing the key motion to the pieces of modified music data also expressing the key motion. The slave hybrid piano 102A processes the pieces of modified music data, and produces the key motion on the basis of the pieces of modified music data. As a result, the hammers 3 give rise to the vibrations of the strings 4 at the end of the rotation, and the tones are radiated from the vibrating strings 4. Although the tones produced by the slave hybrid piano 102A are different in attribute from the tones specified through the master hybrid piano 100A, the music system keeps the produced tones unique to the specified tones in response to user's instruction.

Although the pieces of original music data are coded in accordance with the music protocols different from the MIDI protocols, the music system according to the present invention produces the tones unique to but different from the specified tones.

Computer Program

Description is hereinafter made on control methods realized through the data processing in the master hybrid piano 100A, music data modifier 101A and slave hybrid piano 102A with reference to FIGS. 6A to 6E. Although the master hybrid piano 100A and slave hybrid piano 102A repeat the control sequence on all of the white and black keys 1Ma/1Mb, the figures are simplified as if only one key forms each of the keyboards 1M and 1S.

While the pianist is fingering a piece of music on the keyboard 1M, he or she depresses a white key 1Ma. The key number Kn is assigned to the white key 1Ma. While the white key 1Ma is traveling on the trajectory from the rest position to the end position, the associated key sensor 6M continuously vary the analog key position signal AS1 depending upon current key position. The analog key position signal AS1 is input to the interface 24.

The interface 24 periodically samples discrete values from the analog key position signal AS1. A discrete value is assumed to be sampled as by step S1. The discrete value is converted to a corresponding binary value through the analog-to-digital conversion, and the piece of motion data, which is expressed by the binary value, is fetched from the analog-to-digital converter by the central processing unit 20 as by step S2.

The central processing unit 20 normalizes the piece of motion data yxMd so as to produce the piece of normalized motion data yxM as by step S3. An error component due to the individuality of the key sensors 6M contains an irregular offset voltage S and an irregular gain R. The irregular offset voltage S and irregular gain R are stored in the read only memory 21 as the pieces of calibration data. The signal processing unit 10M determined these factors S and R through experiments, and has stored them in the electrically erasable and programmable read only memory 21. The error component is eliminated from the piece of motion data yxMd.

$$yxM=R\times yxdM+S \qquad \text{Equation 1}$$

The piece of motion data yxMd further contains another error component due to the individuality of the acoustic piano 100*a*. The relative position between the key sensors 6M and the white and black keys 1Ma/1Mb is causative of the error component. The pieces of motion data yxMd at the rest and end positions were determined, and were stored in the read only memory 21 as pieces of calibration data YXDr and YXDe. The central processing unit 20 eliminates the error component due to the individuality of the acoustic piano 100A from the piece of motion data yxMd as follows.

$$yxM=(yxdM-YxDr)/(YXDe-YXDr) \qquad \text{Equation 2}$$

In the slave hybrid piano 102A, normalization, which is corresponding to the normalization in the master hybrid piano 100A, is carried out.

Figure 6A:
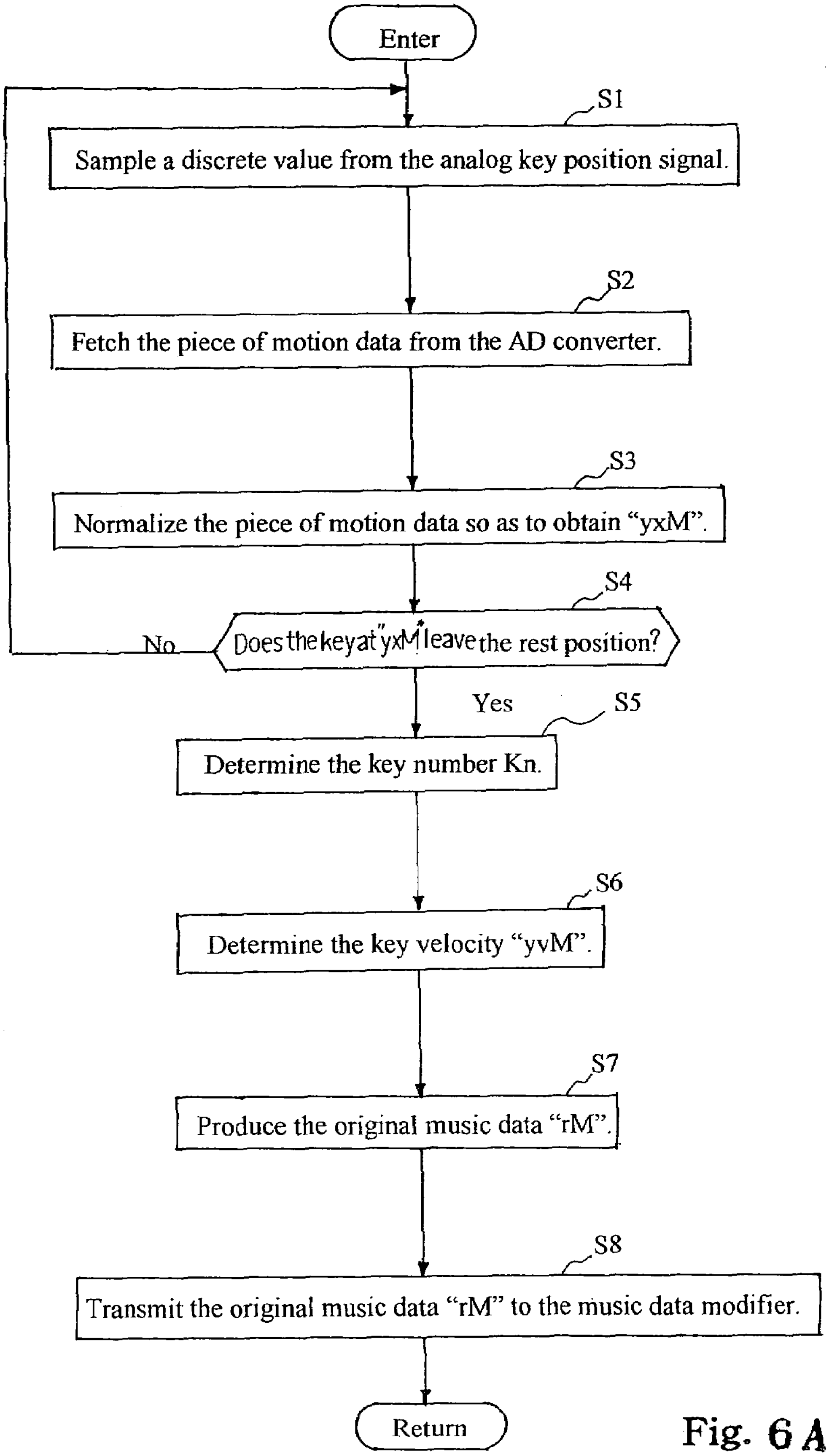
FIG. 6A is a flowchart showing a method of preparing a piece of original music data.

The central processing unit 20 compares the piece of normalized motion data yxM with a piece of reference data expressing the rest position to see whether or not the white key 1Ma leaves the rest position as by step S4. While the white key 1Ma is staying at the rest position, the answer is given negative "No". Then, the central processing unit 20 changes the objective key from the white key 1M assigned the key number Kn to the next key K(n+1). As described hereinbefore, FIG. 6A shows the control sequence as if only one white key 1M forms the keyboard 1M. The central processing unit 20 returns to step S1 on the assumption, and reiterates the loop consisting of steps S1 to S4 until the answer at step S4 is changed to the positive answer.

When the pianist depresses the white key 1Ma, the key sensor 6M starts to vary the piece of motion data yxMa, and the answer at step S4 is given affirmative "Yes". Then, the central processing unit 20 determines the key number Kn assigned the white key 1Ma as by step S5. The key sensors 6M are divided into plural groups assigned different time slots of the sampling cycle, and the key position signals AS1 of each group are input into different analog-to-digital converters. The central processing unit 20 specifies the white key 1Ma on the basis of the combination of time slot and analog-to-digital converter from which the piece of motion data is yxMd fetched. The central processing unit 20 reads the time at which the piece of motion data yxMd is fetched, and memorizes the piece of normalized motion data yxM and the piece of time data t in a predetermined memory location assigned to the key number Kn. A predetermined number of values of the piece of normalized motion data yxM are accumulated in the predetermined memory location together with the piece of time data t in the first-in first-out fashion.

Subsequently, the central processing unit 20 reads out a series of values of the piece of normalized motion data yxM from the random access memory 22, and determines the key velocity as by step S6 through a differentiation, by way of example. The central processing unit 20 accumulates the piece of motion data yvM expressing the key velocity in association with the piece of normalized motion data yxM in the predetermined memory location of the random access memory 22.

Upon completion of the job at step S6, the central processing unit 20 reads out the piece of normalized motion data yxM, piece of motion data yvM and piece of time data t from the predetermined memory location assigned to the key number Kn, and produces the piece of original music data rM as by step S7. As described hereinbefore, the piece of music data includes the piece of motion data rxM expressing the target key position or keystroke, piece of motion data rvM expressing the target key velocity, piece of time data t and piece of identification data KnM expressing the key number Kn.

Finally, the piece of original music data rM is transferred to the transmitter, and is transmitted to the music data modifier 101A as by step S8.

Most of the control method shown in FIG. 6A is implemented by a part of a computer program running on the central processing unit 20. The computer program serves as a subroutine program, and the main routine program periodically branches to the subroutine program at every timer interruption. Other subroutine programs are further incorporated in the computer program. While the main routine program is running on the central processing unit 20, the central processing unit 20 requests the manipulating panel (not shown) to produce various images expressing the current status of the master hybrid piano 100A and prompt messages, and receives user's instruction.

Figure 6B:
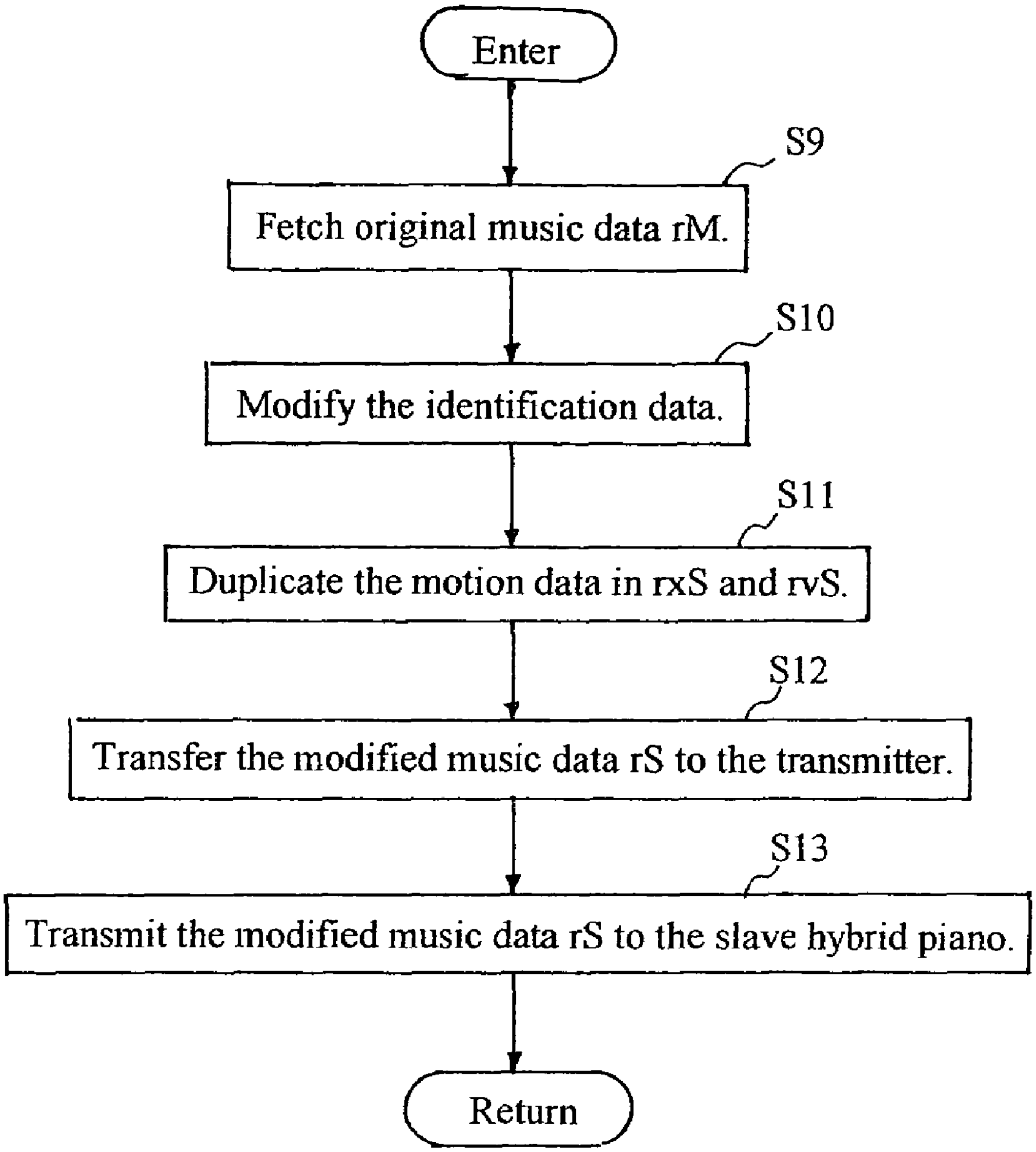
FIG. 6B is a flowchart showing a method of modifying the piece of original music data.

FIG. 6B shows a method for modifying the piece of original music data rM to the piece of modified music data rS. The method is implemented by a subroutine program of a computer program running on a data processing unit of the music data modifier 101A. While a main routine program is running on the central processing unit 20, the central processing unit 20 periodically checks the signal input port assigned to the pieces of original music data rM. The pianist is assumed to have instructed the music data modifier 101A of the octave shift.

The piece of original music data is assumed to arrive at the signal input port. Then, the central processing unit 20 acknowledges the reception of the digital music signal DS1. The main routine program branches to the subroutine program.

The central processing unit 20 fetches the piece of original music data rM from the signal input port, and stores the piece of original music data rM in an internal memory as by step S9. The central processing unit 20 reads out the piece of identification data KnM, and determines the first shifted key number KnS1 and second shifted key number KnS2 as by step S10. The central processing unit 20 memorizes the first shifted key number KnS1 and second shifted key number KnS2 in the random access memory 22.

Only the piece of identification data KnM is changed in the octave shift, and the pieces of motion data rxM and rvM are not changed. For this reason, the central processing unit 20 duplicates the pieces of motion data rxM and rvM into a piece of modified music data rS as by step S11. The piece of time data t and piece of modified identification data KnS1 and KnS2 further form parts of the piece of modified music data rS.

Subsequently, the central processing unit 20 transfers the piece of modified music data rS to the transmitter as by step S12, and the piece of modified music data rS is transmitted from the transmitter to the slave hybrid piano 102A as by step S13.

Figure 6C:
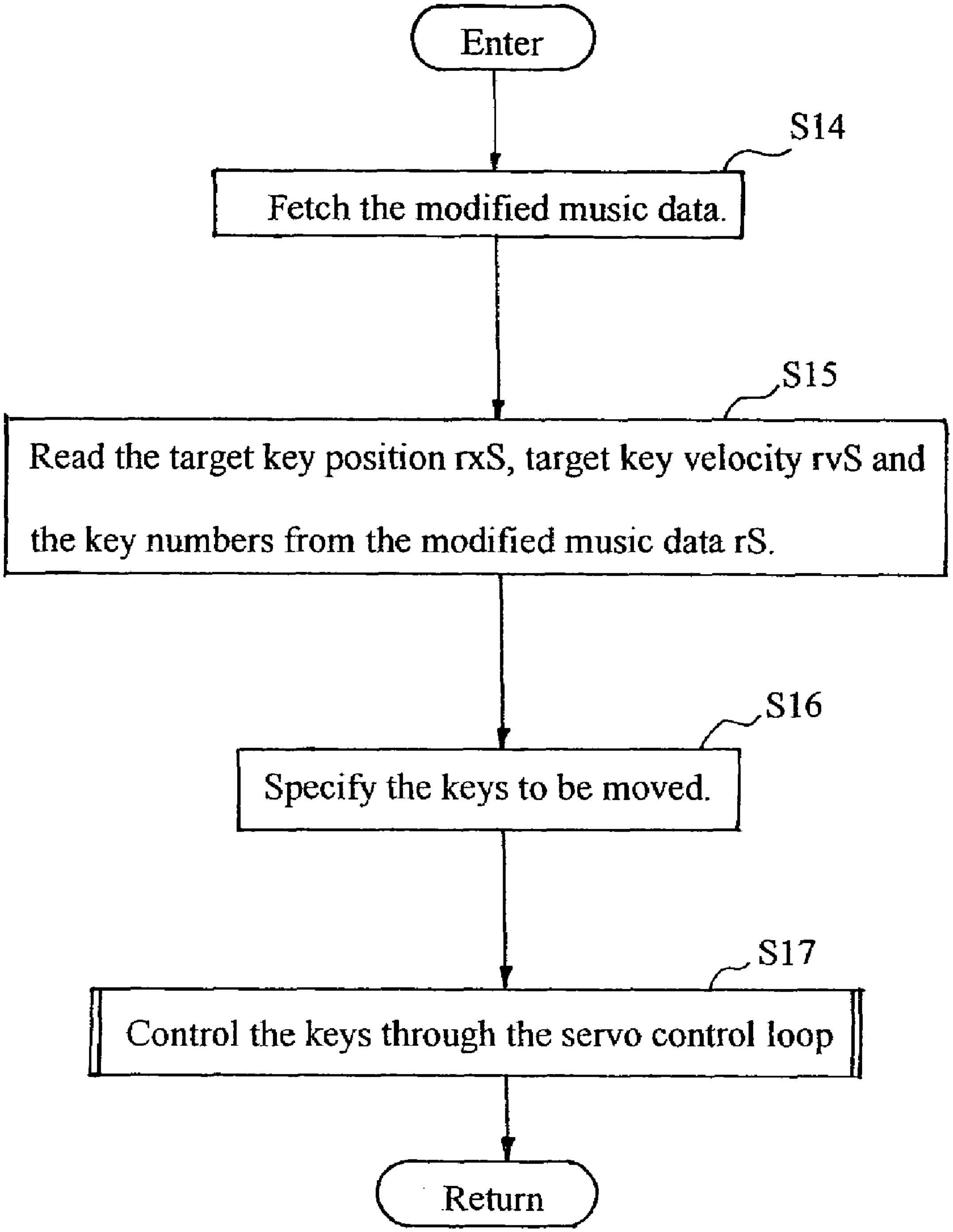
FIG. 6C is a flowchart showing a method of reproducing a key motion on the basis of a piece of modified music data.

FIG. 6C shows a method for reproducing the key motion in the slave hybrid piano 102A. Most of the method is implemented through the execution of a part of a computer program running on the central processing unit 20. The computer program includes a main routine program and several subroutine program, and the part of the computer is corresponding to one of the subroutine program. When a user instructs the slave hybrid piano 102A to reenact the performance on the master hybrid piano 100A, the main routine program starts to branch to the subroutine program at every timer interruption. Although the central processing unit 20 repeats the control sequence for all the white and black keys 1Sa/1Sb, FIG. 6C shows the control sequence as if only one white key 1Sa forms the keyboard 1S for the sake of simplicity.

The central processing unit 20 fetches the piece of modified music data rS from the communication interface 23 as by step S14, and stores the piece of modified music data rS in the random access memory 22.

Subsequently, the central processing unit 20 reads out the pieces of modified identification data KnS1 and KnS2 and pieces of motion data rxS and rvS from the random access memory 22 as by step S15. The central processing unit 20 specifies the white keys 1Sa to be moved as by step S16, and determines the target key position and target key velocity for the white keys 1Sa. The white keys 1Sa to be moved are assigned the key numbers identical with the first shifted key number KnS1 and the second shifted key number KnS2, respectively.

Figure 6D:
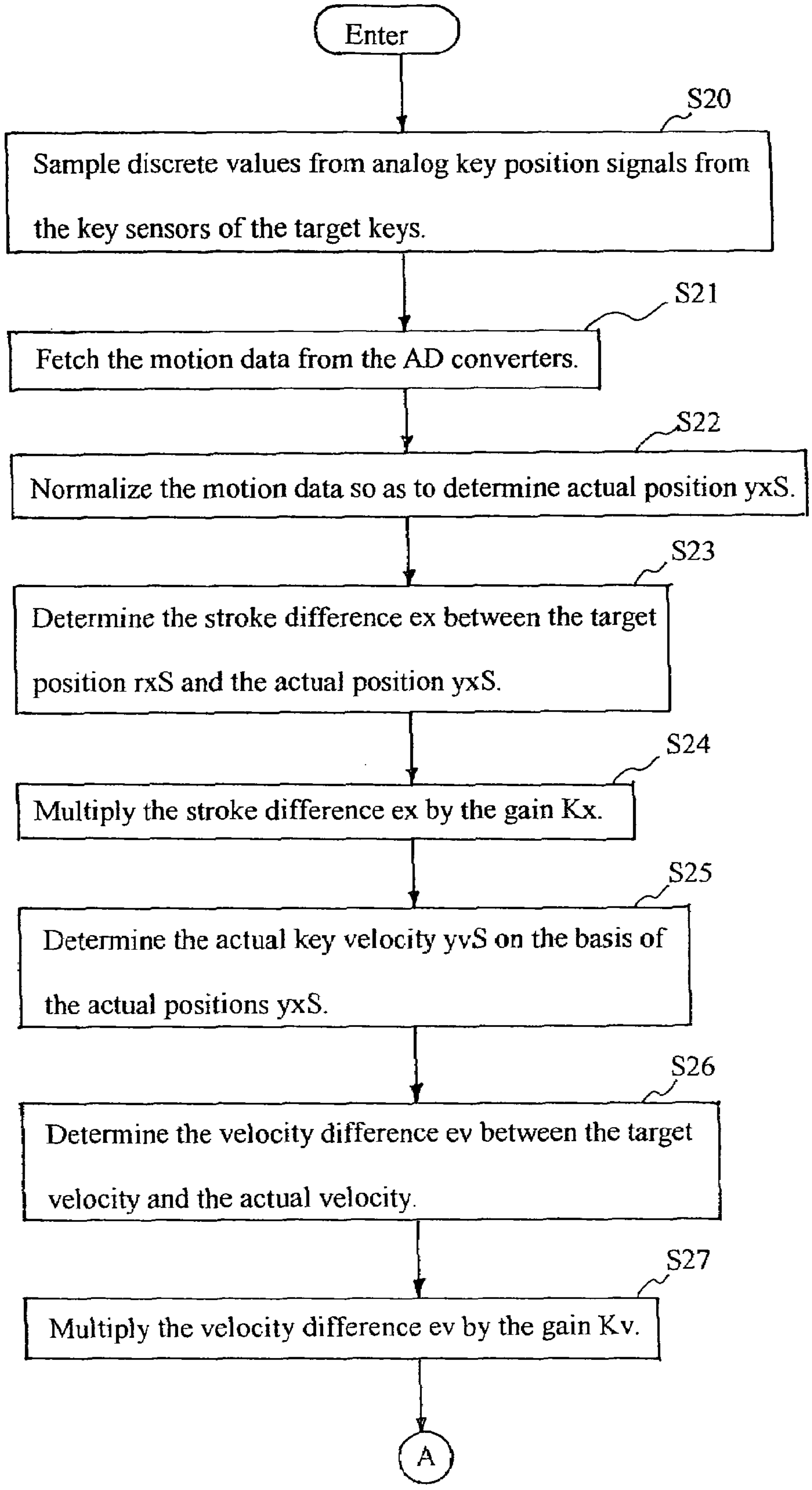
FIGS. 6D and 6E are flowcharts showing a method of servo controlling.
Figure 6E:
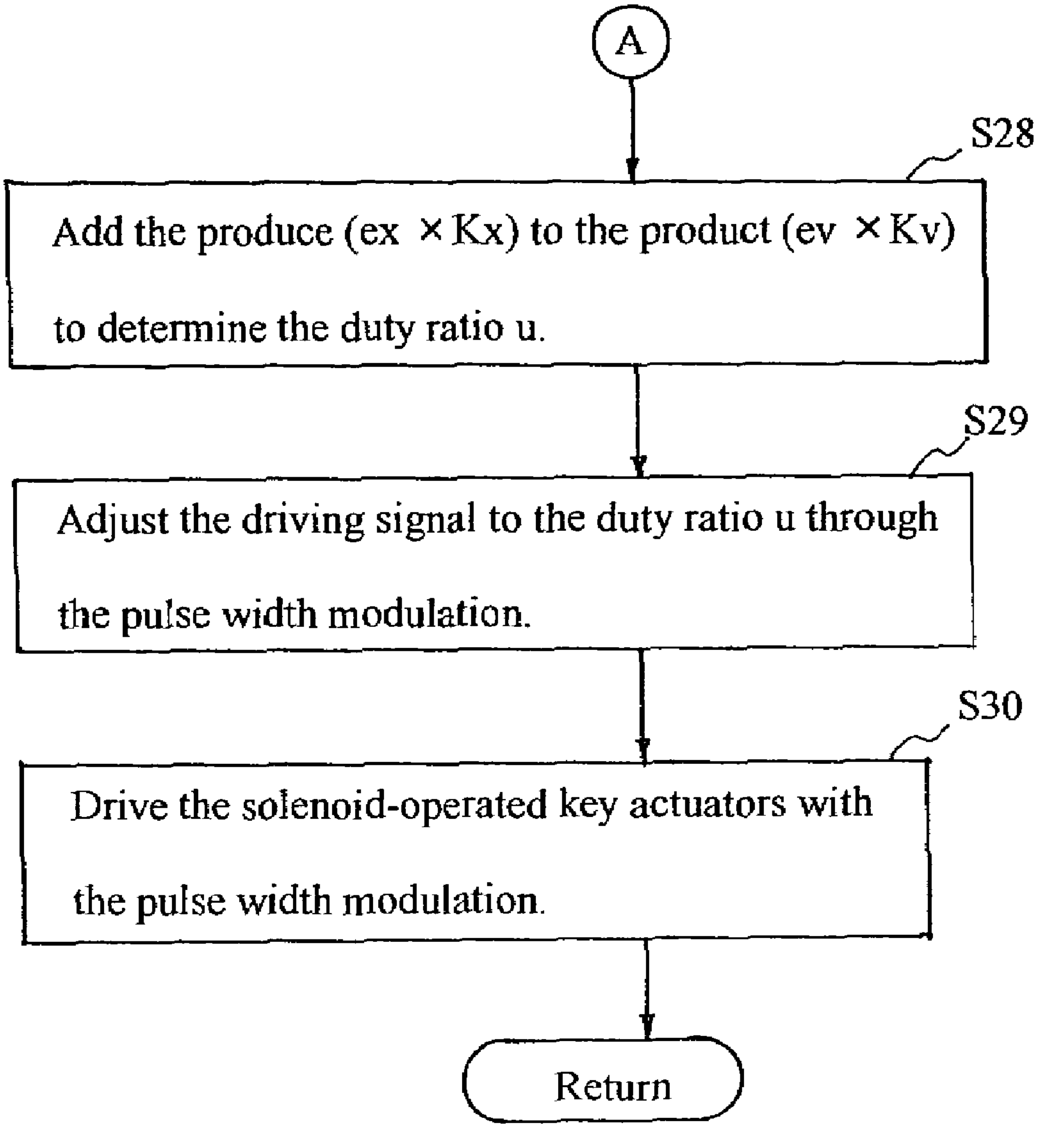

The central processing unit 20 controls the white keys 1Sa through the servo control loop as by step S17. FIGS. 6D and 6E show a control sequence at step S17. Although all the black and white keys 1Sa/1Sb to be moved are controlled through the sequence, description is made on the servo control on the white keys 1Sa assigned the first shifted key number KnS1 for the sake of simplicity.

The analog key position signal AS2, which is supplied from the key sensor 6S associated with the white key 1Sa, is sampled as by step S20, and the discrete value is converted to the digital key position signal DS3. The central processing unit 20 fetches the piece of motion data yxDs from the analog-to-digital converter as by step S21. The piece of motion data yxDs is stored in a predetermined memory location, which has been assigned to the white key 1Sa.

The central processing unit 20 normalizes the piece of motion data yxSd as by step S22. The normalization at step S22 is same as the normalization at step S3. The central processing unit 20 compares the piece of normalized motion data yxS with the piece of motion data rxS, and determines the stroke difference ex therebetween as by step S23. The central processing unit 20 multiplies the stroke difference ex by the gain Kx as by step S24 so that the product ux is determined. The product ux is stored in the random access memory 22.

The central processing unit 20 reads out a series of values of the piece of motion data yxS from the random access memory 22, and determines the actual key velocity as by step S25. The piece of motion data yvS expressing the actual key velocity is stored in the predetermined memory location assigned to the key number KnS1.

Subsequently, the central processing unit 20 compares the piece of motion data rvS and the piece of motion data yvS, and determines the velocity difference ev as by step S26. The central processing unit 20 multiplies the velocity difference ev by the gain Kv as by step S27, and stores the product uv in the random access memory 22.

The central processing unit 20 reads out the products ux and uv from the random access memory 22, and adds the products to each other as by step S28. The sum of products expresses the target duty ratio of the driving signal u, and the central processing unit 20 supplies the target duty ratio u to the solenoid driver 27. The solenoid driver 27 adjusts the driving signal u to the target duty ratio, and supplies the driving signal u to the solenoid-operated key actuator 7 associated with the white key 1Sa as by step S30.

The control sequence shown in FIGS. 6A and 6B are carried out for all the white and black keys 1Ma/1Mb, and the control sequence shown in FIGS. 6C to 6E is repeated for all the black and white keys 1Sa/1Sb to be moved. As a result, the key motion is reproduced by the white and black keys 1Sa/1Sb different from the white and black keys 1Ma/1Mb. Since the pieces of motion data rxM/rvM express the continuous key motion on the trajectory, it is possible to express extraordinary key motion by the pieces of motion data rxM/rvM. In other words, any delicate nuance is memorized in a series of values of the pieces of motion data rxM/rvM. The music data modifier 101A produces the pieces of motion data rxS and rvS from the pieces of motion data rxM and rvM so that the delicate nuance is transplanted into the pieces of motion data rxS and rvS. Thus, the pieces of original music data rM make it possible to express the delicate nuance in the performance, and the music data modifier 101A can modify the pieces of original music data rM to the pieces of modified music data rS without any damage on the delicate nuance.

Second Embodiment

Figure 7:
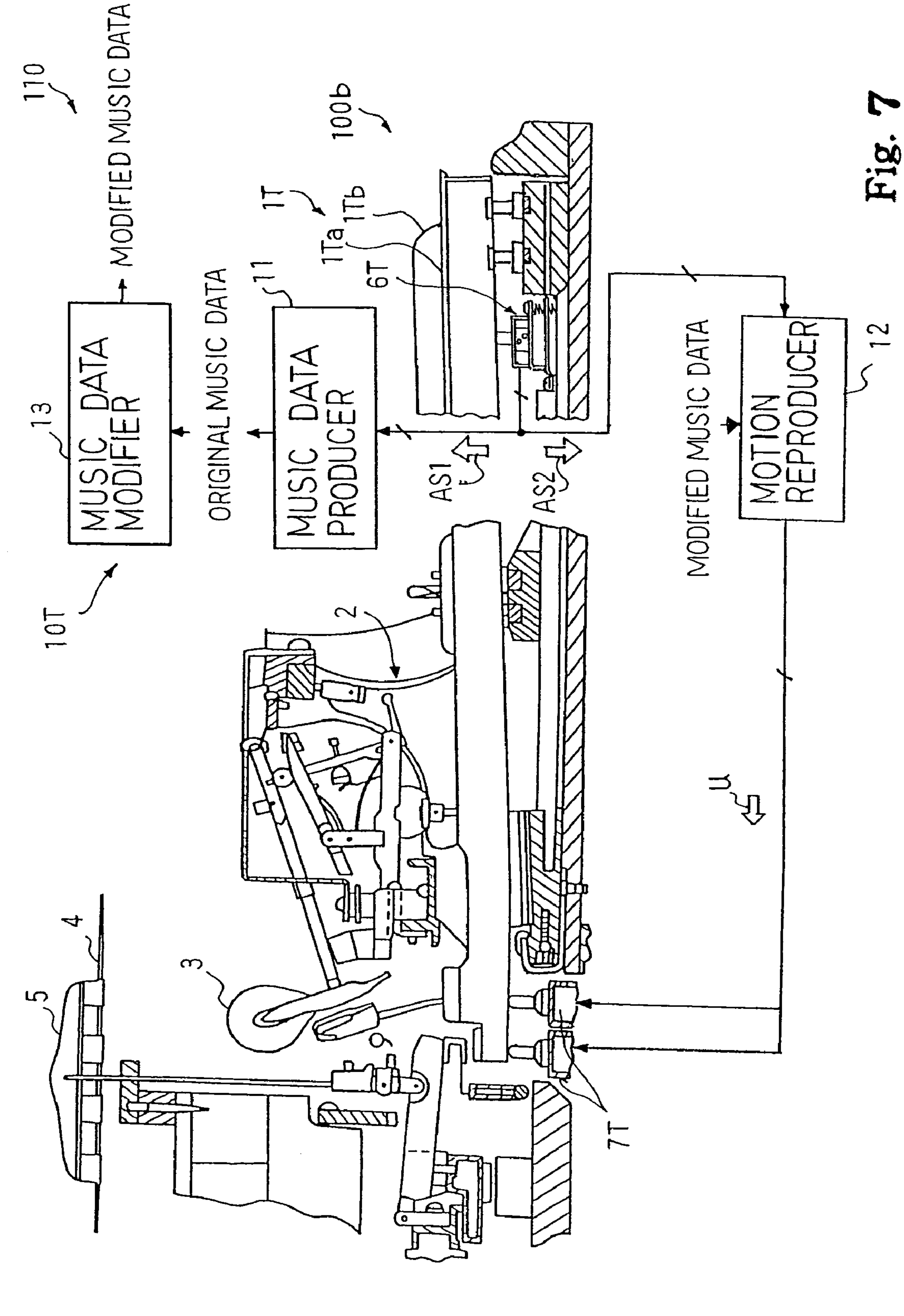
FIG. 7 is a cross sectional side view showing the structure of another music system according to the present invention.

Turning to FIG. 7 of the drawings, another music system embodying the present invention is implemented by a single automatic player piano 110. In other words, the single automatic player piano 110 behaves as the master instrument 100, music data modifier 101 and slave instrument 102.

The automatic player piano 110 comprises an acoustic piano 100*b*, solenoid-operated key actuators 7T, an array of key sensors 6T and a data processing unit 10T. The acoustic piano 100*b* is similar to the acoustic piano 102*a*, and, for this reason, the component parts of the acoustic piano 100*b* is labeled with the references designating the corresponding component parts of the acoustic piano 102*a* except for a keyboard 1T, i.e., white keys 1Ta and black keys 1Tb without detailed description. Since the solenoid-operated key actuators 7T and array of key sensors 6T are similar to the solenoid-operated key sensors 7 and array of key sensors 6M/6S, no further description is hereinafter incorporated for the sake of simplicity.

The data processing unit 10T has a data processing capability, and a computer program runs thereon. The function of the data processing unit 10T is a music data producer 11, a motion reproducer 12 and a music data modifier 13. The acoustic piano 100*b*, array of key sensor 6T and music data producer 11 are corresponding to the master instrument 100, and the acoustic piano 100*b*, solenoid-operated key actuators 7T, array of key sensors 6T and motion reproducer 12 are corresponding to the slave instrument 102. The system configuration of the data processing unit 10T is similar to that shown in FIG. 4 except for the communication interface 23 so that system components of the data processing unit 10T are hereinafter labeled with the references designating the corresponding system components in FIG. 4.

Figure 8:
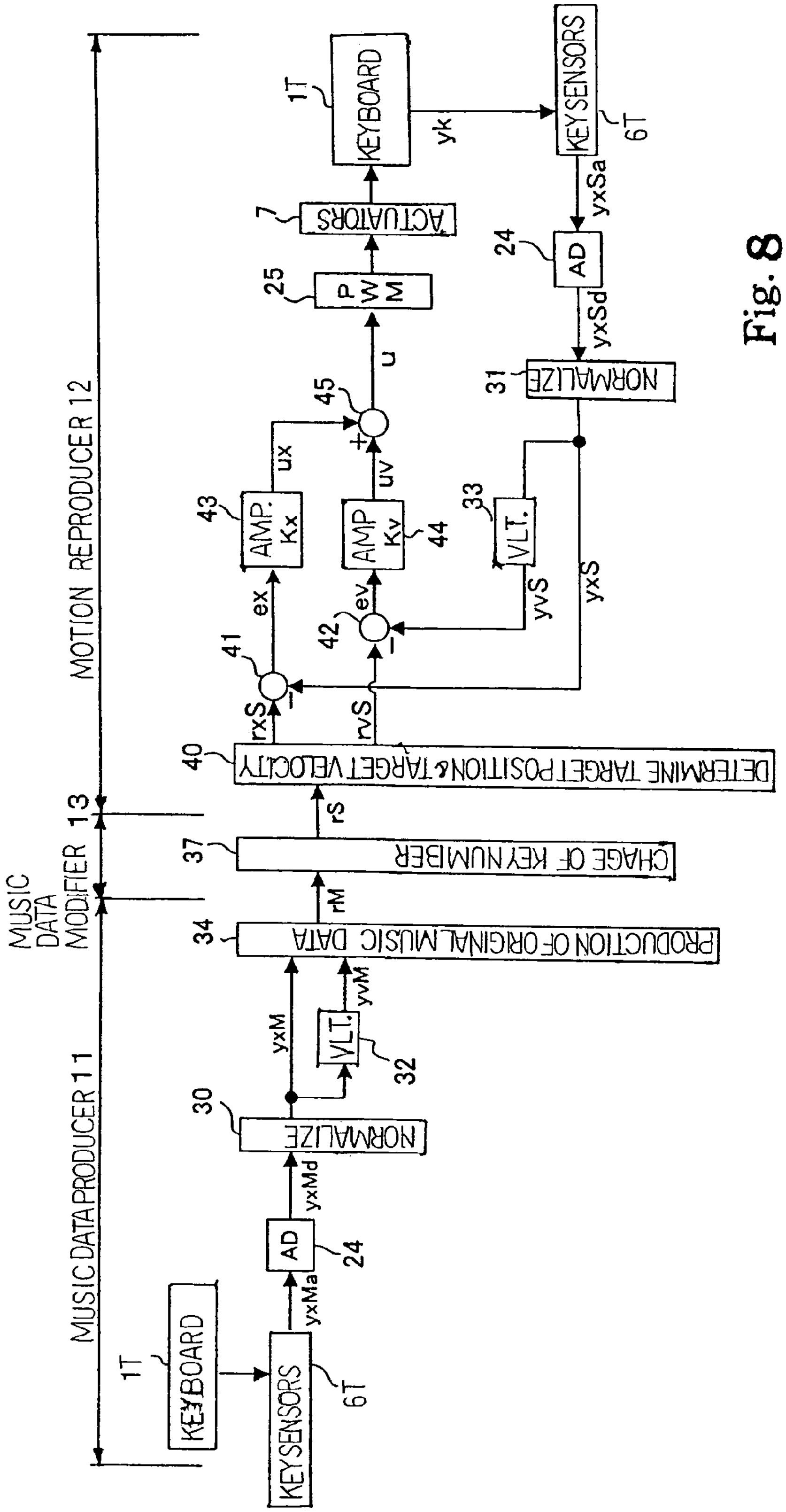
FIG. 8 is a block diagram showing functions of the music system.
Figure 9A:
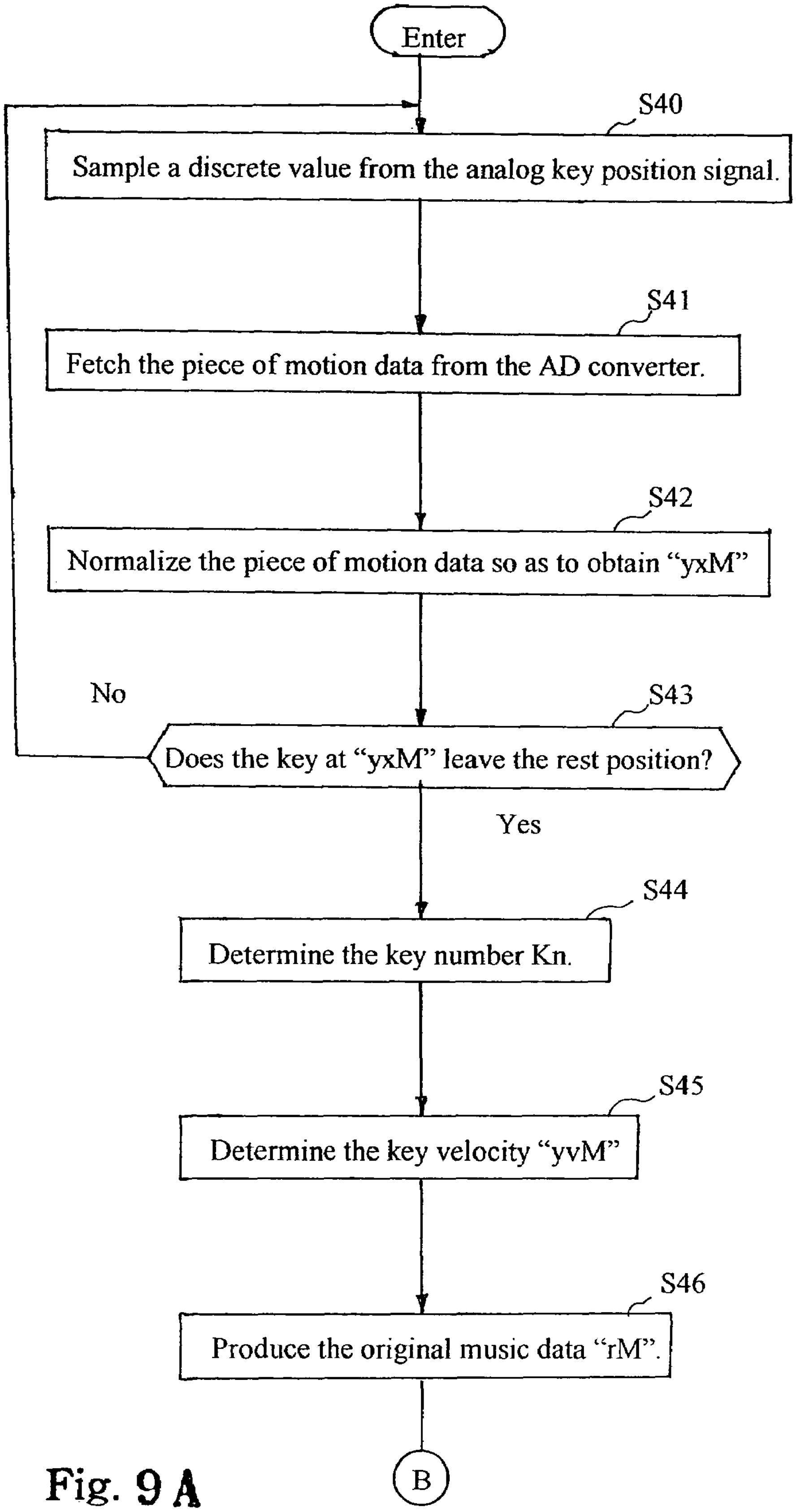
FIGS. 9A and 9B are flowcharts showing a method for reproducing key motion on the music system.
Figure 9B:
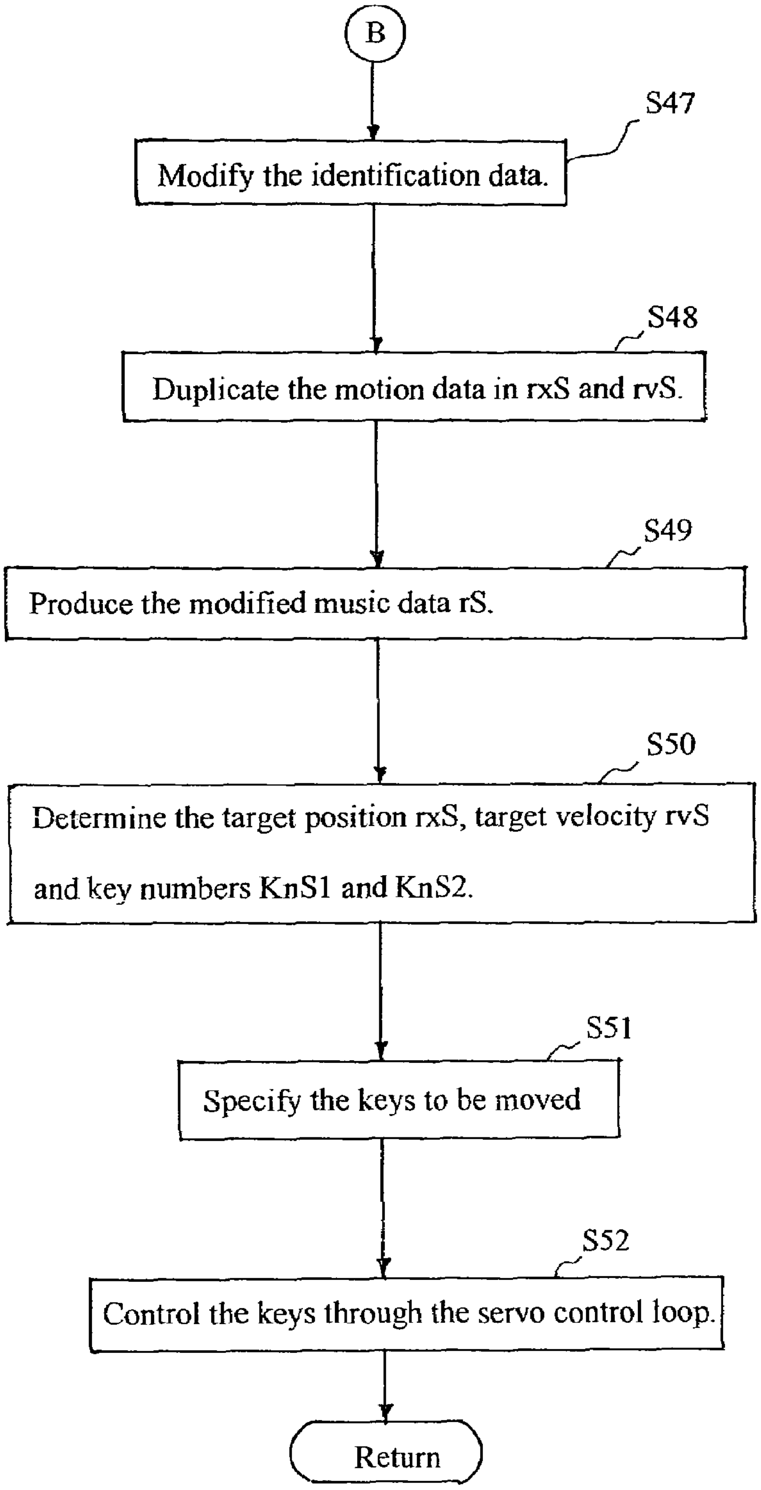

The functions of the data processing unit 10T are detailed in FIG. 8, and a method employed in the music system is shown in FIGS. 9A and 9B. A user is assumed to instruct the data processing unit 10T concurrently to produce the tones after the octave shift. While the user is fingering a piece of music on the keyboard 1T, he or she selectively depresses and releases the white and black keys 1Ta and 1Tb. The user is assumed to depress a white key 1Ta assigned the key number Kn. The associated key sensor 6T continuously converts the current key position to the analog key position signal AS1, and the piece of motion data yxMa, which expresses the current key position, is reported to the interface 24. A discrete value is sampled as by step S40, and the discrete value, which expresses the piece of motion data yxMa, is converted to a binary number expressing a piece of motion data yxMd. The piece of motion data yxMd is fetched from the analog-to-digital converter by the central processing unit 20 as by step S41, and stores the random access memory 22.

The central processing unit 20 normalizes the piece of motion data yxMd so as to produce the piece of normalized motion data yxM as by step S42. The normalization step S42 is corresponding to the function block 30 in FIG. 8.

The central processing unit 20 compares the piece of normalized motion data yxM with a piece of reference data expressing the rest position to see whether or not the white key 1Ta leaves the rest position as by step S43. While the white key 1Ta is staying at the rest position, the answer is given negative "No". Although the central processing unit 20 changes the objective key from the white key 1Ta assigned the key number Kn to the next key K(n+1), the control sequence is simplified. The central processing unit reiterates the loop consisting of steps S40 to S43 until the answer at step S43 is changed to affirmative.

When the pianist depresses the white key 1Ta, the key sensor 6T starts to vary the piece of motion data yxMa, and the answer at step S43 is given affirmative "Yes". Then, the central processing unit 20 determines the key number Kn assigned the white key 1Ma as by step S44. The central processing unit 20 reads the time at which the piece of motion data yxMd is fetched, and memorizes the piece of normalized motion data yxM and the piece of time data t in a predetermined memory location assigned to the key number Kn. Thus, values of the piece of normalized motion data yxM are accumulated in the predetermined memory location.

Subsequently, the central processing unit 20 reads out a series of values of the piece of normalized motion data yxM from the random access memory 22, and determines the key velocity as by step S45. The step S45 is corresponding to the function block 32 in FIG. 8. The central processing unit 20 accumulates the piece of motion data yvM expressing the key velocity in association with the piece of normalized motion data yxM in the predetermined memory location of the random access memory 22.

Upon completion of the job at step S45, the central processing unit 20 reads out the piece of normalized motion data yxM, piece of motion data yvM and piece of time data t from the predetermined memory location assigned to the key number Kn, and produces the piece of original music data rM as by step S46. As described hereinbefore, the piece of music data includes the piece of motion data rxM expressing the target key position or keystroke, piece of motion data rvM expressing the target key velocity, piece of time data t and piece of identification data KnM expressing the key number Kn. The step S46 is corresponding to the function block 34 in FIG. 8. Thus, the music data producer 11 produces the pieces of original music data rM through steps S40 to S46, which are corresponding to steps S1 to S7.

The piece of original music data rM is stored in the random access memory 22, and the music data modifier 13 starts to modify the piece of original music data rM.

The central processing unit 20 reads out the piece of identification data KnM, and determines the first shifted key number KnS1 and second shifted key number KnS2 as by step S47. The octave shifting step S47 is corresponding to the function block 37 in FIG. 8. The central processing unit 20 memorizes the first shifted key number KnS1 and second shifted key number KnS2 in the random access memory 22.

Only the piece of identification data KnM is changed in the octave shift, and the pieces of motion data rxM and rvM are not changed. For this reason, the central processing unit 20 duplicates the pieces of motion data rxM and rvM into pieces of motion data rxS and rvS as by step S48. The central processing unit 20 gathers the pieces of motion data rxS and rvS, piece of time data t and piece of modified identification data KnS1 and KnS2, and produces a piece of modified music data rS as by step S49. The pieces of modified music data rS are stored in the random access memory 22. Thus, the function of the music data modifier 13 is similar to the jobs at steps S10 and S11.

The central processing unit 20 reads out the piece of modified music data rS from the random access memory 22, and determines the target key position rxS, target key velocity rvS and key numbers KnS1 and KnS2 as by step S50. The jobs at step S50 is corresponding to the function block 40 in FIG. 40.

The central processing unit 20 specifies the white keys 1Ta to be moved as by step S51, and starts to control the white keys 1Ta assigned the first shifted key number KnS1 and second shifted key number KnS2 through the servo control loop as by step S52. The jobs at step S52 are corresponding to the function blocks 31, 33, 41, 42, 43, 44 and 45 in FIG. 8. Since the functions blocks 31, 33, 41, 42, 43, 44 and 45 are similar to those shown in FIG. 5A, no further description is hereinafter incorporated for avoiding repetition. The function of the motion reproducer 12 is similar to the jobs at steps S15, S16 and S17.

The servo control loop exactly reproduces the key motion on the basis of the series of values of the piece of modified music data, and the tones, which are different from the original tone by one octave, are produced substantially concurrently with the original tone. In other words, the three tones are concurrently produced from the strings 4 so that the performance is impressive.

As will be understood from the foregoing description, the master instrument 100, music data modifier 101 and slave instrument 102 are implemented by the single automatic player piano. The music system implementing the second embodiment achieves all the advantages of the first embodiment.

Although particular embodiments of the present invention have been shown and described, it will be apparent to those skilled in the art that various changes and modifications may be made without departing from the spirit and scope of the present invention.

The optical key sensors do not set any limit to the technical scope of the present invention. The current key positions are detectable by means of another sort of position transducer such as, for example, a potentiometer. Moreover, the key motion may be expressed by the key velocity or key acceleration on the trajectories. In order to measure the key velocity or key acceleration, a velocity sensor or acceleration sensor monitors the white and black keys 1Ma/1Mb. The velocity sensor may be implemented by a piece of magnet and a coil. A semiconductor acceleration sensor is well known to persons skilled in the art.

The master instrument 100 may be implemented by a mute piano or an automatic player piano. In case where the automatic player piano serves as the master instrument 100, the solenoid driver circuit and solenoid-operated key actuators stand idle, and only the key sensors are active for producing the pieces of motion data. The mute piano includes a hammer stopper and a change-over mechanism. The hammer stopper laterally extends in the space between the hammers and the strings, and a user changes the hammer stopper between a free position and a blocking position as indicated by arrow AR by means of the change-over mechanism. While the hammer stopper is staying at the free position, the hammers are brought into collision with the strings at the end of the rotation, and give rise to the vibrations of the strings. When the user changes the hammer stopper to the blocking position, the hammer stopper is moved out of the trajectories of the hammers, and makes the hammers rebound thereon before striking the strings. Thus, the hammer stopper at the blocking position prevents the strings from vibrations. For this reason, the acoustic piano tones are not produced from the strings in the blocking position.

The acoustic piano does not set any limit to the technical scope of the present invention. One of or both of the hybrid pianos may be replaced with an electronic keyboard. The slave instrument may be implemented by any sort of automatic player musical instrument fabricated on the basis of an organ or harpsichord. Similarly, the master instrument may be implemented by a wind instrument equipped with an array of sensors or a stringed instrument equipped with an array of sensors. The master instrument may be implemented by a personal computer system.

The pulse width modulation does not set any limit to the technical scope of the present invention. The solenoid driver may vary the potential level of the driving signals.

The tasks may be achieved by means of hardware corresponding to the software.

The original motion data may be produced for the current key position or keystroke. In this instanced, the slave hybrid piano 102A or motion reproducer 13 determines the target velocity on the basis of series of values of the pieces of motion data. Of course, only the current key velocity may be determined by using a velocity sensor so that the pieces of original motion data express the current key velocity on the key trajectories.

If a user wishes to hear the acoustic piano tones after the performance on the keyboard 1T, the pieces of modified music data rS are accumulated in the random access memory 22, and the central processing unit 20 starts to process the pieces of modified music data upon acknowledgement of the user's request.

The octave shift does not set any limit to the technical scope of the present invention. In the above-described embodiment, two tones, which are different from the original tone by one octave, are concurrently, produced. However, only one or more than two tones may be produced through the octave shift. A table for transposition may be stored in the music data modifier so as to transpose the original performance.

The key number may not be changed between the piece of original music data and the piece of modified music data. In other words, the piece of identification data KnM may be duplicated in the piece of modified music data.

The music data modifier may change the key motion from that expressed by the pieces of original motion data to another sort of key motion expressed by the pieces of modified motion data. In order to reduce the loudness, a series of values of the piece of original motion data may be proportionally decreased. The series of values may be shrunk or expanded.

In a modification of the first embodiment, the music data modifier 101A may be incorporated in the signal processing unit 10M or 10S.

The strings 5 may be deleted from the master hybrid piano 10A. Otherwise, the strings 5 may be replaced with cushion pads. Any tones are not produced in the master hybrid piano 100A.

In the above-described embodiments, the present invention is only applied to the key motion. The pedal motion may be expressed by other pieces of original music data, a piece of pedal motion data expressing the pedal stroke, a piece of time data t and a piece of identification data expressing the pedal depressed by the pianist. The pieces of original music data may be simply duplicated in the pieces of modified music data so that the pedals are moved as if the player steps on those of the slave hybrid piano 102A.

Claim languages are correlated to the component parts of the above-described embodiments as follows.

One of the white and black keys 1Ma/1Mb and pedals or one of the black and white keys 1Ta/1Tb and pedals are corresponding to a "manipulator", and one of the white and black keys 1Sa/1Sb or one of the white and black keys 1Ta/1Tb is corresponding to a "corresponding manipulator". The random access memory 22 and read only memory as a whole constitute a "memory", and the central processing unit 20, read only memory 21, random access memory 22 and computer program corresponding to the method shown in FIG. 6B or 9B as a whole constitute an "information processor".

The white and black keys 1Ma/1Mb, 1Sa/1Sb or 1Ta/1Tb, action units 2, hammers 3, strings 4 and dampers 5 form in combination a "tone generating system".

The key sensors 6M serve as "plural sensors", and the signal processing unit 10M or music data producer 11 is corresponding to an "information processor". The solenoid-operated key actuators 7 are corresponding to "plural actuators", and the signal processing unit 10S and key sensors 6S or the motion reproducer 12 and key sensors 6T as a whole constitute a "motion controller".

What is claimed is:

1. A music data modifier for modifying a piece of original music data expressing continuous motion of a manipulator assigned a pitch name to a piece of modified music data expressing continuous motion of a corresponding manipulator assigned a pitch name different from said pitch name, comprising:

a memory for storing at least a piece of instruction data representative of a task given by a user; and an information processor changing a piece of identification data in said piece of original music data and expressing said pitch name of said manipulator to a piece of identification data contained in said piece of modified music data and expressing said pitch name of said corresponding manipulator through an execution of a series of jobs for achieving said task.

2. The music data modifier as set forth in claim 1, in which said pitch name assigned to said manipulator is different from said pitch name assigned to said corresponding manipulator by an octave.

3. The music data modifier as set forth in claim 1, in which said piece of original music data further contains a piece of original motion data expressing a series of values of physical quantity of said manipulator, and said piece of modified music data further contains a piece of modified motion data expressing a series of values of said physical quantity of said corresponding manipulator.

4. The music data modifier as set forth in claim 3, in which said physical quantity is at least one sort selected from the group consisting of position, velocity, acceleration and force.

5. The music data modifier as set forth in claim 3, in which said physical quantity is a combination of two sorts selected from the group consisting of position, velocity, acceleration and force.

6. A music data modifier for modifying a piece of original music data expressing continuous motion of a manipulator to a piece of modified music data expressing continuous motion of a corresponding manipulator, comprising:

a memory for storing at least a piece of instruction data representative of a task given by a user; and an information processor partially changing said piece of original music data to said piece of modified music data through an execution of a series of jobs for achieving said task, wherein said manipulator is assigned a pitch name same as a pitch name assigned to said corresponding manipulator so that said piece of original music data contains a piece of motion data different from a piece of motion data contained in said piece of modified music data and expressing said continuous motion similar to said continuous motion of said manipulator.

7. A musical instrument comprising:

a tone generating system including plural manipulators respectively assigned pitch names different from one another and selectively moved by a player for specifying tones to be produced; and a music data modifier modifying a piece of original music data expressing continuous motion of a manipulator to a piece of modified music data expressing continuous motion of a corresponding manipulator, and including a memory for storing at least a piece of instruction data representative of a task given by a user and an information processor changing a piece of identification data contained in said piece of original music data and expressing the pitch name of one of said plural manipulators to a piece of identification data contained in said piece of modified music data and expressing the pitch name of another of said plural manipulators through an execution of a series of jobs for achieving said task.

8. The musical instrument as set forth in claim 7, in which said player is a human player fingering a music passage on said plural manipulators.

9. The musical instrument as set forth in claim 8, further comprising plural sensors for converting said continuous motion of said manipulator to a piece of motion data expressing said continuous motion, and an information processor connector to said plural sensors and producing said piece of original music data containing said piece of motion data.

10. The musical instrument as set forth in claim 9, in which said manipulators and said plural sensors are corresponding to white and black keys of an acoustic piano and key sensors monitoring said white and black keys.

11. The musical instrument as set forth in claim 10, in which said white and black keys form said tone generating system together with action units, hammers, strings and dampers.

12. The musical instrument as set forth in claim 7, in which said piece of original music data further contains a piece of original motion data expressing a series of values of physical quantity of said manipulator, and said piece of modified music data further contains a piece of modified motion data expressing a series of values of said physical quantity of said corresponding manipulator.

13. The musical instrument as set forth in claim 7, in which said player is an automatic player including plural actuators responsive to driving signals for moving said plural manipulators, and a motion controller analyzing said piece of modified music data so as to produce said driving signals and selectively supplying said driving signals to said plural actuators.

14. The musical instrument as set forth in claim 7, in which the pitch name of said one of said plural manipulators is spaced from the pitch name of said another of said plural manipulators by an octave.

15. A music system for producing tones, comprising a master instrument including plural manipulators selectively moved for specifying tones to be produced, plural sensors monitoring said plural manipulators, and converting continuous motion of said plural manipulators to pieces of motion data each expressing a series of values of physical quantity representative of said continuous motion of associated one of said plural manipulators, and an information processor connected to said plural sensors, and producing pieces of original music data each expressing said continuous motion of said associated one of said plural manipulators;

a music data modifier connected to said master instrument, and including a memory for storing at least a piece of instruction data representative of a task given by a user, and an information processor partially changing said pieces of original music data to pieces of modified music data expressing continuous motion to be produced for other manipulators through an execution of a series of jobs for achieving said task; and a slave instrument including said other manipulators independently moved, plural actuators respectively associated with said other manipulators and responsive to driving signals for selectively reproducing said continuous motion of said other manipulators, and a motion controller connected to said music data modifier and producing said driving signals so as selectively to supply said driving signals to said plural actuators.

16. The music system as set forth in claim 15, in which said master instrument is remote from said slave instrument so that said at least either said pieces of original music data or said pieces of modified music data is transmitted to one of said music data modifier and said slave instrument through a communication channel.

17. The music system as set forth in claim 16, in which each of said pieces of original music data contains a piece of original identification data expressing one of said plural manipulators and said piece of motion data expressing said series of values of physical quantity of said one of said plural manipulators, and said piece of modified music data contains a piece of modified identification data expressing one of said other manipulators and said piece of modified motion data expressing said series of values of said physical quantity of said one of said other manipulators.

18. The music system as set forth in claim 15, in which an array of manipulators serves as both of said plural manipulators and said other manipulators, and a data processing system is shared among said information processor of said master instrument, said information processor of said music data modifier and said information processor of said slave instrument.

19. The music system as set forth in claim 18, in which said array of manipulators are linked with hammers through action units, and said hammers are brought into collision with strings at the end of rotation so as to produce said tones from the vibrating strings.

20. A musical instrument comprising:

A tone generating system including plural manipulators selectively moved by a player for specifying tones to be produced; and a music data modifier modifying a piece of original music data expressing continuous motion of a manipulator to a piece of modified music data expressing continuous motion of a corresponding manipulator, and including a memory for storing at least a piece of instruction data representative of a task given by a user and an information processor partially changing said piece of original music data to said piece of modified music data through an execution of a series of jobs for achieving said task, wherein said manipulator is assigned a pitch name same as a pitch named assigned to said corresponding manipulator so that said piece of original music data contains a piece of motion data different from a piece of motion data contained in said piece of modified music data and expressing said continuous motion similar to said continuous motion of said manipulator.

* * * * *